United States Patent [19]

Weintraub et al.

[11] 4,217,541
[45] Aug. 12, 1980

[54] METHOD OF ACCURATE CONTROL OF CURRENT AND POWER OF A MAGNETIC CURRENT AND POWER CONTROL DEVICE

[75] Inventors: Morton Weintraub; Elliot Waxman; Bernard Gendelman, all of Brooklyn, N.Y.

[73] Assignee: Herman Rossman, Brooklyn, N.Y.

[21] Appl. No.: 798,261

[22] Filed: May 18, 1977

[51] Int. Cl.² .............................................. G05F 7/00
[52] U.S. Cl. ....................................................... 323/51
[58] Field of Search ............... 335/273, 275, 276, 176; 336/134; 323/51, 52, 89 MS, 89 C

[56] References Cited

U.S. PATENT DOCUMENTS

| | | | |
|---|---|---|---|
| 1,756,875 | 4/1930 | Montsinger | 336/134 |
| 1,943,463 | 1/1934 | Von Ohlsen et al. | 323/51 |
| 2,488,393 | 11/1949 | Geiselman | 323/89 MS |
| 3,213,353 | 10/1965 | Stilphen | 323/51 |
| 3,280,375 | 10/1966 | Jensen | 336/134 |
| 3,356,822 | 12/1967 | Bennett | 323/51 |
| 3,549,990 | 12/1970 | Hochheiser | 323/51 |
| 3,716,719 | 2/1973 | Angelery et al. | 323/51 |

FOREIGN PATENT DOCUMENTS

| | | | |
|---|---|---|---|
| 336170 | 2/1936 | Italy | 323/51 |
| 45-29336 | 9/1970 | Japan | 323/51 |

*Primary Examiner*—William M. Shoop

[57] ABSTRACT

A method and a device which are dependently and cojointly employed in the accurate control of the increase and decrease of alternating current, direct current, and concomitant electrical current extending through circuitry and passing to and through electrical devices, electrical appliances, electrical equipment, electrical motors, and electrical apparatuses which are connected to the innovative device. The method and the means of the innovative device can be applied and adapted to enable a plurality of capabilities such as: breaking a circuit; controlling automatically current, amperage dimming lighting systems; controlling automatically the movement and direction of electrical appliances; controlling automatically a constant level of current; input and output; controlling automatically the intensity of light; controlling automatically a plurality of electrical apparatuses; measuring weight as a sensitive scale; acting as a distributor; acting as a brushless motor; acting as a resistor; acting as a relay; acting as a voltage regulator; and other similar capabilities. The method includes the primary step of inducting a counter inductive magnetic field and concomitant inductive current to resist and expel the incoming current proceeding from an energy source; and a secondary step of reducing a counter inductive magnetic field and concomitant inductive current to advance and impel the incoming current.

11 Claims, 23 Drawing Figures

METHOD OF ACCURATE CONTROL OF CURRENT AND POWER OF A MAGNETIC CURRENT AND POWER CONTROL DEVICE

BACKGROUND OF THE INVENTION

1. Field of the Invention

This invention relates to a method of accurate control of current and the magnetic current power control devices employable with the same.

2. Description of Prior Art

There are basically three distinct prior art methods of accurate control of electrical current. These methods comprise:

(A) A method related to the implementation of resistance.

(B) A method related to the utilization of centrifugal force.

(C) A solid state process.

Method (A) implements a resistance wire wound around a block, where a metallic object makes contact with the resistance wire. With every increase in current in the resistance wire, there is produced a concomitant decrease in voltage; with every decrease in the resistance wire there is produced a concomitant increase in voltage. This method of accurate control of current in electrical apparatuses and circuitry, involves the direct contact of wire wound around a metal block, thereby making direct contact with electricity.

Method (B) uses centrifugal force to stop a motor at a given speed and to keep the motor within a given speed range. This method which entails adjusting a connector on a live wire also involves direct contact with electricity.

Method (C) includes a solid state circuitry of one kind or another, whereby the increase or decrease of current, via a volume control, increases the current passing through a tube or transistor, thus respectively increasing or decreasing the supply.

All these three prior art methods operate by breaking and making contact to open and close circuits.

All these three prior art methods of accurate current control of electrical current involve direct contact with electricity.

All these three prior art methods operate by either changing the physical makeup of a substance or by changing the gravitational potential of the substance.

All these three prior art methods involve inherent and concomitant operational hazards and limitations as they involve direct contact with electricity. Some of these hazards and limitations can be listed as follows:

1. The hazard of causing personal injury due to shock.

2. The danger of causing fire and ignition by sparking when exposed wires come in contact with water.

3. The limitation of shortening the life of the electrical device due to normal overheating, which may also cause fire.

4. The limitation of the adverse effect of humidity or extreme temperature changes on accurate control of current passing to and through electrical devices.

5. The danger of causing an explosion when used in close proximity to volatile gases or explosives.

6. The limitation of underwater operations when devices are used with insufficient insulation.

7. The limitation of forming extensive noise distortion when used in close proximity to radio or television reception.

Present methods of accurate current control are incapable of employing a single electrical device or means to control simultaneously or independently the speeds of several divergent electrical motors, when each motor involves the same or different amperage requirements.

SUMMARY OF THE INVENTION

It is therefore an objective of the invention to provide a method of accurate control of electrical current which operates on the basis of opening and closing a circuit without making or breaking contact.

Another objective of the invention is to provide a method of accurate control of current which said method is linked to a magnetic current control device that operates on the basis of expulsion and impulsion of current.

Yet another objective of the invention is to provide a method of accurate control of current by means of a magnetic current control device that enables a counter-feedback of electrical current which meets head on the incoming electrical current thereby negating or cancelling said incoming current.

Still another objective of the invention is to provide a method of accurate control of current by means of a magnetic current control device that enables the accurate control of the slightest change in either increase or decrease of current and the accurate control of the acceleration and deceleration of current which said current emanates from an energy source, extends through circuitry, and passes to and through electrical appliances, devices, motors, and apparatuses.

A further objective of the invention is to provide a method of accurate control of current by means of a magnetic current control device that enables an unlimited amount of current to be controlled by one said device.

Yet another objective of the invention is to provide a method of accurate control of curent by means of a magnetic current control device, which said device is enabled to drive a plurality of divergent electrical devices, apparatuses and motors.

Still another objective of the invention is to provide a method of accurate control of current by means of a magnetic current control device, which said device enables operations that entail close proximity to volatile gases, dangerous explosives, and underwater activity, without the necessity of special insulation.

A further objective of the invention is to provide a method of accurate control of current by means of a magnetic current control device to enable electrical devices and appliances under its control, never to break down as a result of overheating or burning out.

Yet another objective of the invention is to provide a method of accurate control of current by means of a magnetic current control device that operates without the emission of sparks to cause fire or to ignite.

Yet another objective of the invention is to provide a method of accurate control of current by means of a magnetic current control device which enables the control of both alternating and direct current passing to and through circuits and electrical apparatuses.

A further objective of the invention is to provide a method of accurate control of current by means of a magnetic current control device that provides a stabilized balanced motor regardless of the variations of voltage input levels passing through the circuitry and attached electrical appliances and devices.

A further objective of the invention is to provide a method of accurate control of current by means of a magnetic current control device that functions as a circuit breaker.

Still another objective of the invention is to provide a method of accurate control of current by means of a magnetic current control device that provides automatic control of current, voltage, amperes, passing through circuits, wires, electrical devices, electrical appliances, and electrical equipment.

Still another objective of the invention is to provide a method of accurate current control by means of a magnetic current control device which enables the reduction of current to lighting equipment to provide a dimming effect.

Yet another objective of the invention is to provide a method of accurate current control by means of a magnetic current control device that enables automatically the maintenance of current output at a constant level, eventhough voltage input in the electrical circuit varies below or above said constant level.

Yet another objective of the invention is to provide a method of accurate current control by means of a magnetic current control device that enables automatic control of DC devices.

A further objective of the invention is to provide a method of accurate control of current by means of a magnetic current control device that enables the control of movement and direction of any electrical device, motor, and equipment.

A further objective of the invention is to provide a method of accurate control of current by means of a magnetic current control device that enables the control of a plurality of electrical devices, apparatuses, equipment, and motors, independently of one another or simultaneously in conjunction with one another.

A further objective of the invention is to provide a method of accurate control of current by means of a magnetic current control device, which said device can be adapted to the functioning of a sensitive accurate scale.

A further objective of the invention is to provide a method of accurate control of current by means of a magnetic current control device, which said device can be adapted to the functioning of a thermostat for temperature control.

A further objective of the invention is to provide a method of accurate control of current by means of a magnetic current control device, which said device can be adapted to the functioning of a distributor.

Yet another objective of the invention is to provide a method of accurate current control by means of a magnetic current control device, which said device can be adapted to the functioning of a brushless motor.

Yet another objective of the invention is to provide a method of accurate current control by means of a magnetic current control device, which said device can be adapted to the functioning of a relay Yet another objective of the invention is to provide a method of accurate current control by means of a magnetic current control device, which said device operates without forming noise distortion when used in close proximity to radio or television reception.

The magnetic current control device, employed to enable AC operations, includes a basic arrangement of components and circuitry comprising:

A magnetic iron core having coiled wire magnetic wire windings, which said magnetic iron core having an open gap that separates the top portion of the vertical arms of the said magnetic iron core, which said open gap can be alternately closed and alternately opened by means of a metal bar attached to said magnetic iron core;

a metal bar, which said metal bar is attached to said magnetic iron core, which said metal bar is enabled to be lowered and elevated, or rotated and directed, by means of a screw connected to said metal bar, which said screw when rotated in one direction elevates said metal bar, which said screw when rotated in the opposite direction lowers said metal bar, wiring, connected to said magnetic iron core and connected to a plurality of connected electrical apparatuses, which said wiring passes the electrical current through the circuits;

a fine tuning knob in conjunction with a power control knob, that provide the means for accurate control of said electrical current passing through said circuits, which said fine tuning knob is connected to a meshing gear and which said power control knob is geared to said meshing gear;

a plurality of outlets to receive the plugs of a plurality of electrical apparatuses for the simultaneous and/or independent control of electrical current passing to and through said plurality of electrical apparatuses requiring the same or different amperage amounts which said outlets are connected to the coil.

The magnetic current control device, employed to enable DC operations, includes a basic arrangment of components and circuitry, substantially similar to the innovative device employed in enabling AC operations, except for the following basic additional components:

A transistor employed as an oscillator which creates an oscillated magnetic field throughout the magnetic iron core, which said transistor is connected on one side to a power source and is connected on another side to a coil wound around the core, which said coil having three wires, of which one wire leads to the collector of the transistor, of which a second wire is center tapped, and of which a third wire leads to a capacitor which feeds the signal to the base of the transistor;

and, a resistor employed to bias the said transistor, which said resistor is connected on one side to the base of the transistor and on the other side is connected to the coil which feeds the signal through the capacitor to the base of the transistor.

The method of accurate current control, which is linked to the said device, and which is dependent on said device for the implementation of its steps, comprise two basic steps: A primary step, is the inducting of a counter inductive magnetic field and concomitant inductive current to resist and expel the incoming current proceeding from an energy source; and secondary step, is the reducing of a counter inductive inductive magnetic field and concomitant inductive current to advance and impel the incoming current proceeding from an energy source.

The said innovative device operating in accordance with the method, and the method operating by means of said innovative device, controls accurately the rate, speed, and degree of expulsion of the incoming current proceeding from the energy source, and controls accurately the rate, speed, and degree of impulsion of the incoming current proceeding from the energy source.

In theory, this is how the magnetic current control device in accordance with the innovative method controls the increase and decrease of current.

The innovative device comprises: A magnetic iron "U" shaped core with plastic covered primary magnetic coil windings wound around the vertical arms and the horizontal bottom of the said magnetic iron core; an iron bar, employed as a closing and opening magnetic device, is attached to said magnetic iron core, and is located above the gap at the top portion of the vertical arms of the iron core. When the elevated hinged, said iron bar is lowered directly towards the top of said magnetic iron core, bridging the two vertical sides of the said iron core, closing and covering the gap between them, and changing the "U" shaped magnetic iron core to a square shaped magnetic iron core, a counter inductive magnetic field is formed with a concomitant counter inductive alternating current. The said current proceeding from the said magnetic iron core, passes through the magnetic coiled windings and the circuit, and meets up with an incoming current proceeding from the energy source. The said counter inductive current resists and expels the incoming current gradually or immediately, from the wire coiled windings and the circuit, thereby controlling the current passing to and through the attached or connected electrical apparatus, by decreasing the current. When the lowered said hinged metal bar is elevated and displaced from the top of the said iron core, changing its square shape to a "U" shape, removing the bridge from the vertical sides of said magnetic iron core, opening and uncovering the gap, the counter inductive magnetic field and the concomitant counter inductive alternating current proceeding from the magnetic iron core is reduced and displaced, thereby advancing and impelling the incoming current proceeding from the energy source through the circuit and coiled wire windings and increasing the current.

Though some minor changes can be made by those skilled in the art, in particular components used or specific substances adapted, the spirit and idea underlying the innovative device still remains unaltered. Modifications may be made by adding on components, by changing relationships, and by deleting certain parts, however the basic ill inclusive method of controlling the increase and decrease of electrical current by the impulsion and expulsion of electrical current proceeding from an energy source, remains the same in all applications and adaptations of the innovative method used in conjunction with the innovative device.

Figure 1:
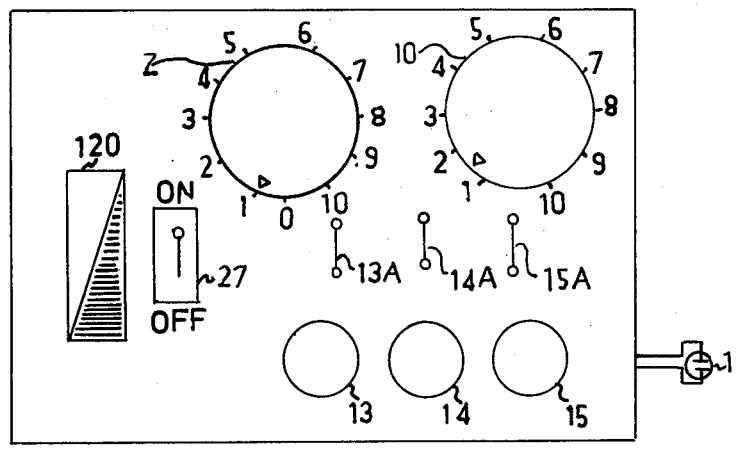
FIG. 1, is a schematic drawing illustrating the external operations of the magnetic current control device in controlling AC operations.

Note: throughout this patent application and in all the figures the basic components are the following:

A magnetic iron core having coiled magnetic wire windings and a gap separating the the vertical arms of the said iron core to induce a counter inductive magnetic field;

a metal bar attached to said iron core to cover and uncover alternately, the gap separating the vertical arms of said iron core, and to repel and impel alternately the incoming current wiring for passing the said electrical current Note also that throughout this patent application by the terms "counter inductive magnetic field" and "counter inductive alternating current" we mean a magnetic field induced by the magnetic wire winding wound around the magnetic iron core, which said magnetic field counters the incoming current and power stemming from an energy source by resisting it.

Note too, that throughout this application when referances are made to a U shaped core such references are intended as a reference point as most cores are U shaped having vertical arms. The principles and applications thereof disclosed herein apply as well to circular shaped cores having rounded arms and to other irregularly shaped U shaped cores.

DESCRIPTION OF THE PREFERRED EMBODIMENTS

Hereinafter, for the sake of brevity and facility of expression, the innovative device, Magnetic Current Power Control Device, shall be abbreviated and referred to throughout the remainder of the patent application as the M.C.P.C.D..

Describing now the external operations of the M.C.P.C.D. in controlling AC operations. See FIG. 1.

Plug (1) is plugged into an energy source and provides current to the electrical cord, circuits, and M.C.P.C.D.. Switch 27 is turned ON. Power control knob (Z) is set to any desired amperage between 1 and 10. Control knob (Z) controls the current passing to and through any electrical device and any electrical appliance connected to the outlets of the M.C.P.C.D.. Fine tuning control (10) is set to any desired precise decimal amperage from 0.1 to 0.99. The tuning control (10) controls the precise current to any electrical device and electrical appliance connected to the outlets of the M.C.P.C.D. For example: It is desirable in a given situation to have current set at 3.7 amperes. The power control knob (Z), then, is set to number 3, and the fine tuning control (10) is set to 0.7. Thus we have the precise current setting and controlling operation to implement 3.7 amperage. The same procedure is employed to set and control any number or decimal number of ampere reading. Each of the three outlets (13),(14), and (15) have different ratings of current. The number of amperages provided by each outlet is inscribed on the outside plate of said outlet. To serve more than one electrical appliance or electrical device from one outlet, each said appliance or said device requiring the same number or decimal ampers, an arrangement of a plugged in extension may be implemented in any one of the said outlets. Meter 120 provides readings which indicate the current status of the attached electrical appliances and electrical devices and enables the accurate and precise control of said connected devices and appliances. The position of the needle in one segment of the meter indicates an abnormal current status, such as an overload or a short, whereas the position of the needle in the opposite segment of the meter indicates a normal status, such as an adequate current implementation.

Figure 2:
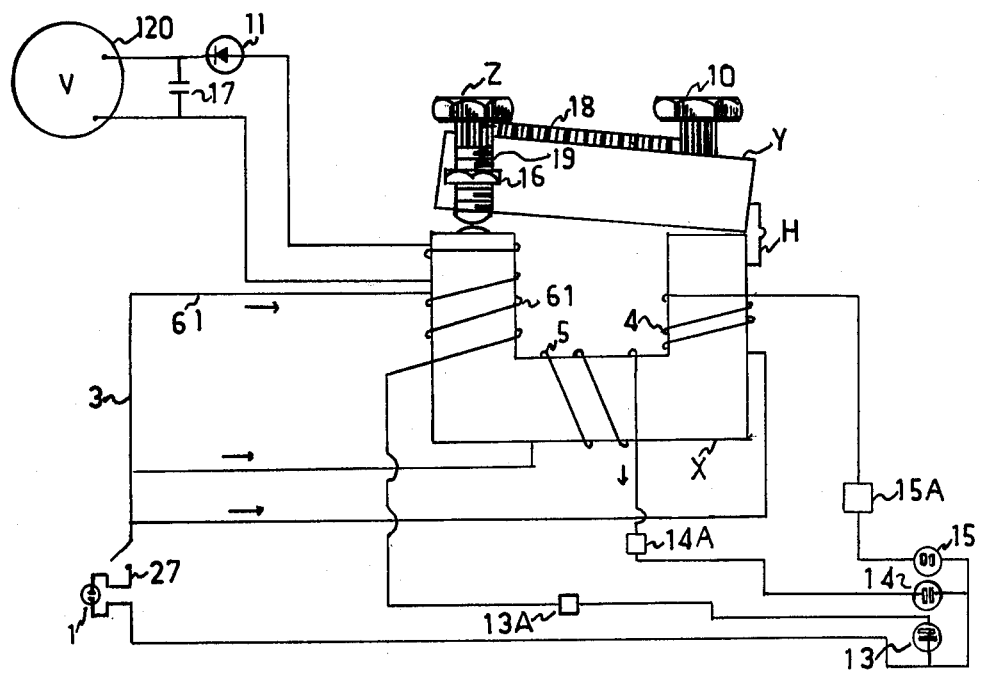
FIG. 2, is a schematic drawing illustrating the application of innovative method of accurate current control in conjunction with the magnetic current control device in controlling AC operations.

Describing now the internal operation of the M.C.P.C.D. in controlling AC operations: See FIG. 2.

Plug 1 is plugged into the energy source, a wall outlet, which provides sufficient energy for the electrical cord, circuits, and M.C.P.C.D.. The horizontal extension from plug 1 extends to outlets 13, 14, and 15. The vertical extension from plug 1 extends to switch 27 which when set to ON closes the entire circuit and passes the current from the source wire 3. From wire (3) the current is passed on to three different coils, 4, 5, 61, thereby energizing them. The three different coils extend to three different outlets, with three different current ratings. Coil 4 extends to outlet 15, which has an amperage output of 5 amperes; coil (5) extends to outlet 14 which has an amperage output of 10 amperes; and coil 61 extends to outlet 13 which has an amperage output of 1 ampere. The three separate outlets 13 14 and 15, served respectively by three switches 13A, 14A and 15A, either enable independent operation and control of the current passing to the three separate outlets, or enable jointly the operations and controls of the current passing to the concurrent outlets. When switches 13A, 14A and 15A are closed, the M.C.P.C.D. is enabled to operate and control jointly the current passing to all the three said outlets. When the switch of one of the said outlets is closed, and the switches of the other two said outlets are open, then the M.C.P.C.D. independently operates and controls the current passing through the said closed switch to said respective outlet. Any one switch may be applied independently or concurrent with the other two switches to enable either independent or concurrent current control. The three coils 4, 5, and 61 create a magnetic field about the iron core X, which counter inducts itself. When the magnetic bar Y is completely lowered, thereby closing the exposed gap between the two vertical sides of the iron core X a feed back of current occurs. The feed back of current creates a counter inductance into lines 4, 5, and 61, thereby resisting and expelling incoming current proceeding from the energy source. The said resistance to the said incoming current is high enough to close off the current feeding into the three outlets 13, 14 and 15. The power control knob Z is rotated clockwise, the iron bar Y is raised high enough to cancel the magnetic field about the iron core x and to cancel the counter inductance created in lines 4, 5 and 61, thereby advancing and impelling the current proceeding from the power source feeding current into the three outlets, 13, 14 and 15. H is the hinge used for connecting moveable bar to the iron core Throughout this specification said hinge is designated as H. When the fine tuning control (10) is turned clockwise, the precise control is exercised in conjunction with power control knob (Z). Fine tuning control (10) is connected and aligned with gear (18), which in turn is connected and aligned with power control knob (Z). Gear (18) regulates proportionately and concomitantly the rotation of both fine tuning control (10) and power control knob (z). When fine tuning control (10) is rotated a complete turn clockwise from 0.1 to beyond 0.99, power control knob (Z) is rotated clockwise, one complete number. When power control knob (Z) is rotated clockwise one half the way from one number to the next number, fine tuning control (10) is rotated clockwise from 0.1 to 0.5. Thus the rotation of 1/10th of a distance between one number and the next by the power control knob (Z) is equal to the rotation of fine tuning control (10) from one decimal number to the next decimal number. This set constant relationship exercised by gear (18) upon power control knob (Z) and fine tuning control (10) applies to counter clockwise rotations as well as clockwise rotations. Meter 120 which provides current status readings indicating either a normal current status or an abnormal current status, receives it current from coil 61. Coil 61 which is wound around the iron core (x) receives some of said core's magnetic field and alternating current, when the magnetic field about iron core (x) is activated. Diode (11) changes AC to DC proceeding from iron core (X). Filter (17) filters out the DC ripple thereby stabilizing the needle of the meter. Table screw (19) enables the magnetic metal bar (18) to be raised, thereby increasing the current proceeding from the energy source, or lowered, thereby decreasing the current proceeding from the energy source. Nut (16) keeps the table screw in a vertical position as the table screw rotates clockwise or counterclockwise. Meter 120 functions in the following manner: An electrical device is plugged into outlet (13) for e.g., and power control knob (z) is rotated to number 10, which indicates full current Switch (13A) serving outlet (13) is set to ON, and the connected electrical device is energized. If meter 120 has a reading of 5, then a normal current status exists. If the meter reading is beyond 5, for e.g. 6,7,10 then the meter reading indicates an abnormal current status. Each electrical device has its own amperage requirements. Any attached electrical device that receives an amperage beyond its normal current reading on meter 120 would cause an abnormal status reading.

Describing now the internal operations of the M.C.P.C.D. in functioning as a circuit breaker. See FIG. 3.

Figures 3, 3A:
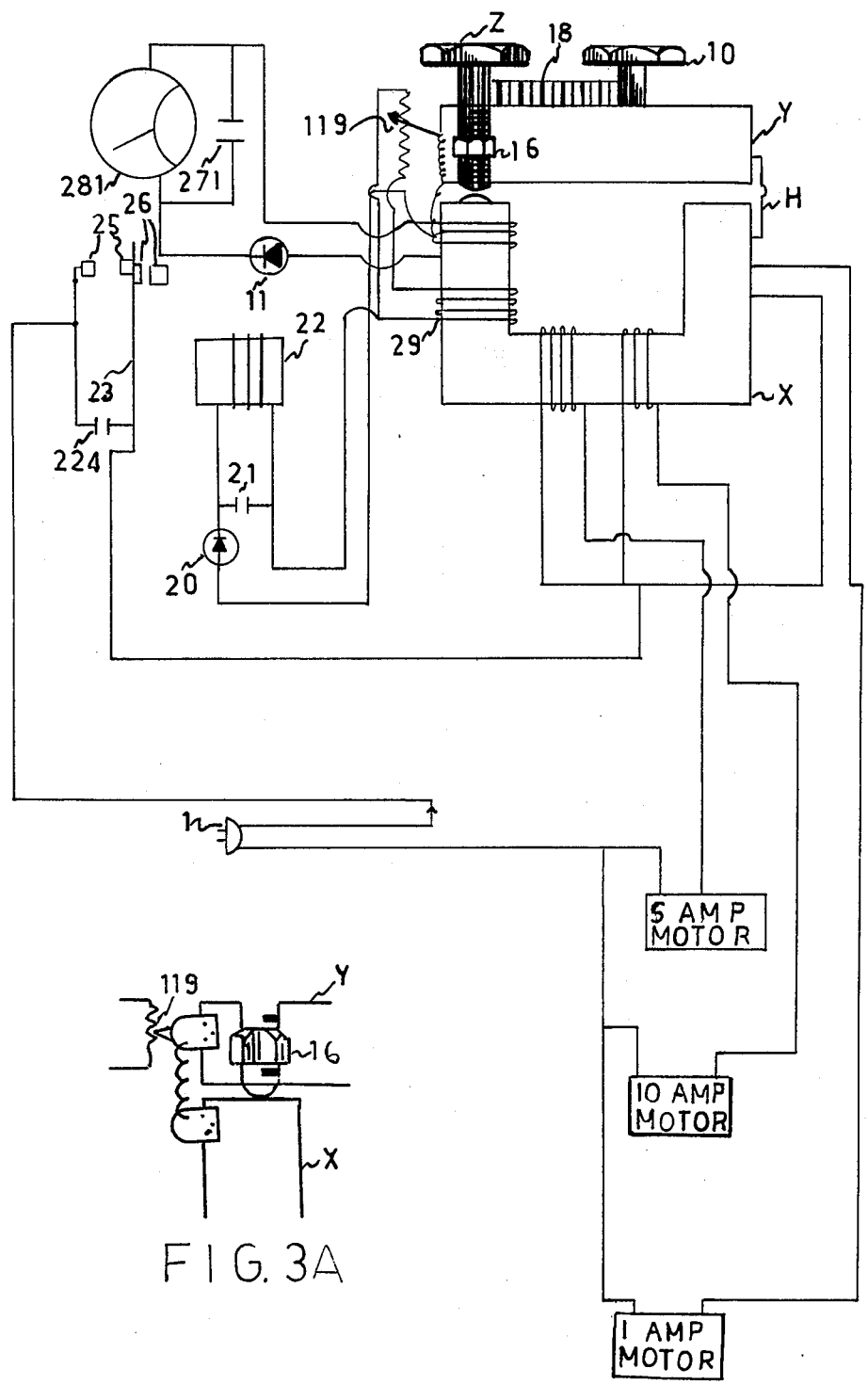
FIG. 3, is a schematic drawing illustrating the internal operations of the magnetic current control device, operating in accordance with the innovative method, in functioning as a circuit breaker simultaneously as it controls the increase and decrease of electrical current proceeding from an energy source.
FIG. 3A is an enlarged view of the variable resistor controlling the circuit breaker.

The M.C.P.C.D. in FIG. 3 is operated internally in the manner as the M.C.P.C.D. illustrated in FIG. 3, except for the following additional parts and circuitry; Relay 22, variable resistor 119 diode 20, fulter capacitor 21, relay bar 23 capacitor 224, and magnetic contacts 25 and 26, Coil 29 functions in conjunction with resistor 119 as follows:

The voltage applied to coil 29, a maximum output of 10 volts, activates relay 22, thereby drawing in relay bar 23 and thereby opening switch 25. The opening of switch 25 enables the opening of the main circuit that extends down to plug 1. The opening of the main circuit breaks off the current of all the electrical appliances and electrical devices attached to the main circuit, thereby acting as a circuit breaker. The voltage applied to coil 29 stems from the magnetic field of iron core X. When metal bar Y is lowered completely onto the vertical sides of iron core X, thereby totally closing and bridging the gap that exists between the two said sides, the voltage output to coil 29 is lowered to minimum. When metal bar Y is raised completely from the vertical sides of iron core X, thereby totally opening and exposing the gap that exists between the said sides, the voltage output to coil 29 is raised to maximum. When an increase of 1 ampere or more is present in the circuit, the circuit breaker becomes operative thereby opening up the circuit.

Figure in circle is an enlarged view of variable resistor 119 controlling the circuit breaker.

Variable resistor 19 operating in conjunction with the power control knob Z (see FIG. 1 and FIG. 4) functions as follows: When the power control knob is rotated clockwise, from number 1 to number 10, the metal bar Y is fully raised, and maximum current is fed into all the connected electrical appliances and electrical devices. Relay 22 is set to its lowest sensitivity thereby requiring a large current change to induce a high enough voltage across coil 29 in order to draw in relay 22. At this point variable resistor 119 is set at minimum. Note that H is the hinge When power control knob Z is rotated counter clockwise from number 10 to number 1, metal bar Y is fully lowered and minimum current is fed into all connected electrical appliances and devices. Relay 22 is set to its highest sensitivity and requires a small current change to induce enough voltage across coil 29 to draw in relay 22. At this point variable resistor 119 is set at maximum. In this manner, variable resistor 119, operating in conjunction with power control knob Z automatically controls itself and sets itself at various setttings to enable the M.C.P.C.D. to function as a circuit breaker. Any overload or short in the circuit automatically trips the realy 22 and breaks the circuit. Contacts 25 and 26, are partially magnetized to resist rumble and to close the relay contact, thereby stabilizing the current passing through these contacts. The two magnetic contacts 26 when tripped hold the main circuit open. To turn current back to on, switch 23 is manually turned to ON, only after the defective device or appliance has been disconnected. Note that when magnetic contacts 26 are removed the relay will reset itself automatically when the defective load is removed. Capacitors 21, 224, and 271 function as follows: Filter capacitor 21 purifies DC for stable operation of relay coil 22. Capacitor 224 reduces the sparking effect on contacts 25 and 26 which occurs when opening or closing the main power switch. Filter capacitor 271 stabilizes the meter 28 to enable it to be read without vibration of DC ripple.

Describing now the external operation of the M.C.P.C.D. in functioning as a circuit breaker. See FIG. 4.

Figure 4:
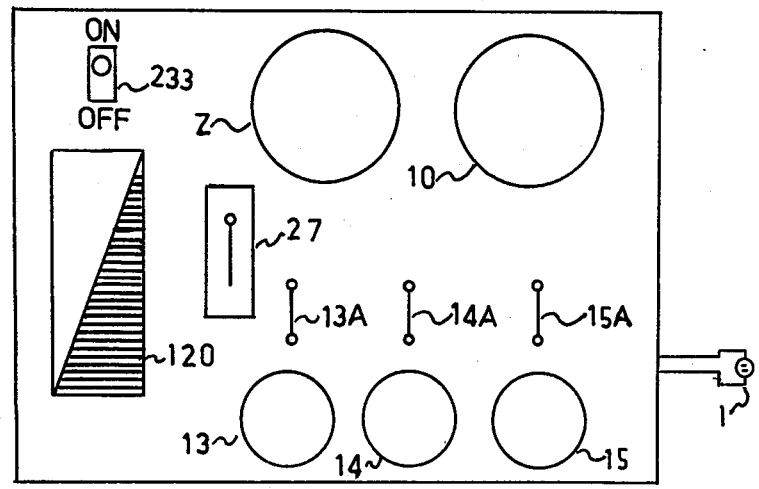
FIG. 4, is a schematic drawing illustrating the external operations of the magnetic current control device, operating in accordance with the innovative method, in functioning as a circuit breaker.

The M.C.P.C.D. is operated externally in FIG. 4 as the M.C.P.C.D. illustrated in FIG. 1, and is designed in the form as the M.C.P.C.D. illustrated in FIG. 1, except for the feature of the circuit breaker 23 which breaks the circuits leading to outlets 13, 14, and 15 when a short or overload is present in these circuits.

Figure 5:
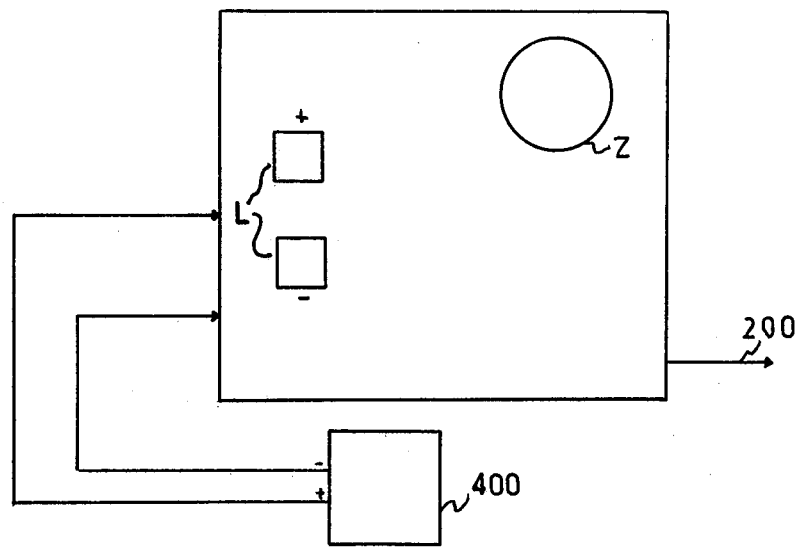
FIG. 5, is a schematic drawing illustrating the external operations of the magnetic current control device in controlling DC operations.

Describing now the external iperations of the M.C.P.C.D. in controlling DC operations. See FIG. 5.

Plug 200 is connected to a DC power supply or battery which feeds current into the M.C.P.C.D. output terminals L. The positive and negative poles of the M.C.P.C.D. are connected to the appropriate polarity, minus to minus, plus to plus. Power control knob (Z) controls the power fed to the DC device. By turning the power control knob (Z) clockwise, from number 1 to number 10, the current fed to the DC device is decreased 0.400 is a DC device connected to and controlled by the M.C.P.C.D.

Describing now the internal operations of the M.C.P.C.D. in controlling DC operations. See FIG. 6.

Battery feeds 4.5 volts of power to positive terminal entering light bulb 102 through the emitter of PNP transistor 103, to its base to coil 54. From coil 54 current enter wire 60 to the negative terminal of the battery. From wire 60 current passes to coil 70 to capacitor (not shown); 80 connected to resistor 59 which is connected to the base of transistor 103 Current will now oscillate. When bar y is raised above core (X) this causes an increase in current as it causes an increase in the frequency of oscillation, hence causing an increase in light intensity of bulb 102. Lowering bar (Y) by turning adjusting knob (Z) causes a decrease in frequency which in turn causes a decrease in current hence lowering the intensity of light to bulb 103.

Figure 6A:
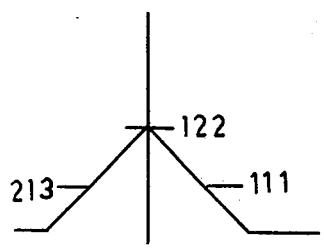
FIG. 6A depicts the waveform.
Figure 6:
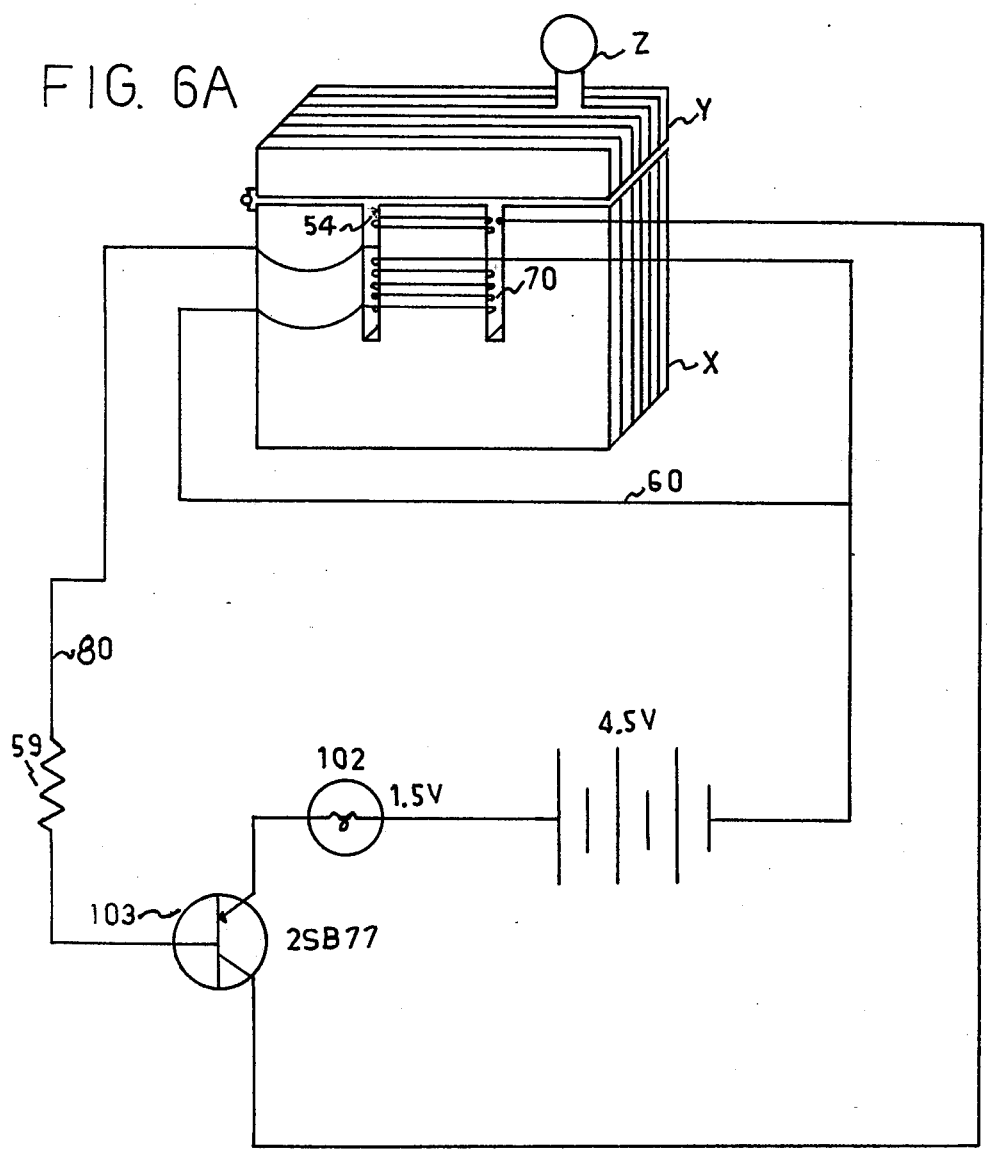
FIG. 6, is a shematic drawing illustrating the application of the innovative method of accurate current control in conjunction with the magnetic current control device in controlling DC operations.

In the waveform depicted in FIG. 6A, we can see how the M.C.P.C.D. operates. Line 122 represents the highest drain of current to a given frequency. As the frequency drops towards line 213 current will decrease, the frequency increases from point 122 to point 111 we again have a decrease in current and a resulting decrease in light intensity. In the position wherein the oscillator is set at point 213 with bar Y closing the gap of core (X) an increase in current would result as knob Z raises bar Y, while wherein closing the gap of core (x), (Y) is set to position 122 current is then decreased when knob (Z) raises bar (Y) above core (X). Note that the hinge is shown on the left side of bar Y. Fine tuning knob (not swown) serves to adjust the gap opening for precise decimal amperages when such is required.

It should be noted that in all of the figures in this application showing the M.C.P.C.D. controling dc operations we can have a change the oscillation frequency that would result in (1) an operation whereas when bar (Y) is raised this would cause a decrease of current and conversely by lowering bar (Y) results in an increase of current or by (2) raising bar (Y) results in an increase of current while lowering bar (Y) results in a decrease of current—by adjusting the frequency of oscillation to provide the desired result as shown previously.

It should also be noted that any M.C.P.C.D. operating in conjunction with a dc device that has an inducting effect such as a motor creating dc pulses or a vibrating relay etc. could increase or decrease current through the device by the M.C.P.C.D.

Figure 7:
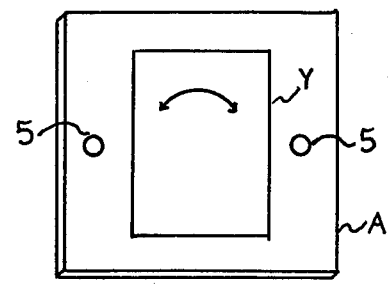
FIG. 7, is a schematic drawing illustrating the external operations of the magnetic current control device, operating in accordance with the innovative method, in functioning as a light switch and light dimmer.

Describing now the external operations of the M.C.P.C.D. in functioning as a light switch and light dimmer. See FIG. 7.

The ON/OFF dimming knob (Y) is turned ON when rotated to a horizontal position and turned OFF when rotated to a vertical position. A dimming effect is provided on connected lighting equipment when the ON/OFF dimming knob is set anywhere in between the horizontal and vertical position. The closer the rotation of the said knob to the vertical position, the greater the effect of dimming on the connected lighting equipment. The closer the rotation of the said knob to the horizontal position, the less the effect of dimming on the connected lighting equipment. When set $\frac{1}{2}$ of the way between the horizontal and vertical position, the ON/OFF dimming knob (Y) would provide a dimming effect of 50%. When set $\frac{1}{4}$ of the way from the vertical position and $\frac{3}{4}$ of the way to the horizontal position, the ON/OFF dimming knob (Y) provides a dimming effect of 75%. (Y) is the top front of the metal bar (Y) which is used to open and close the circuit, gradually or immediately. (A) is the baseboard of the switch. (S) are the two screws that attach the baseboard of the switch to the wall.

Figure 8:
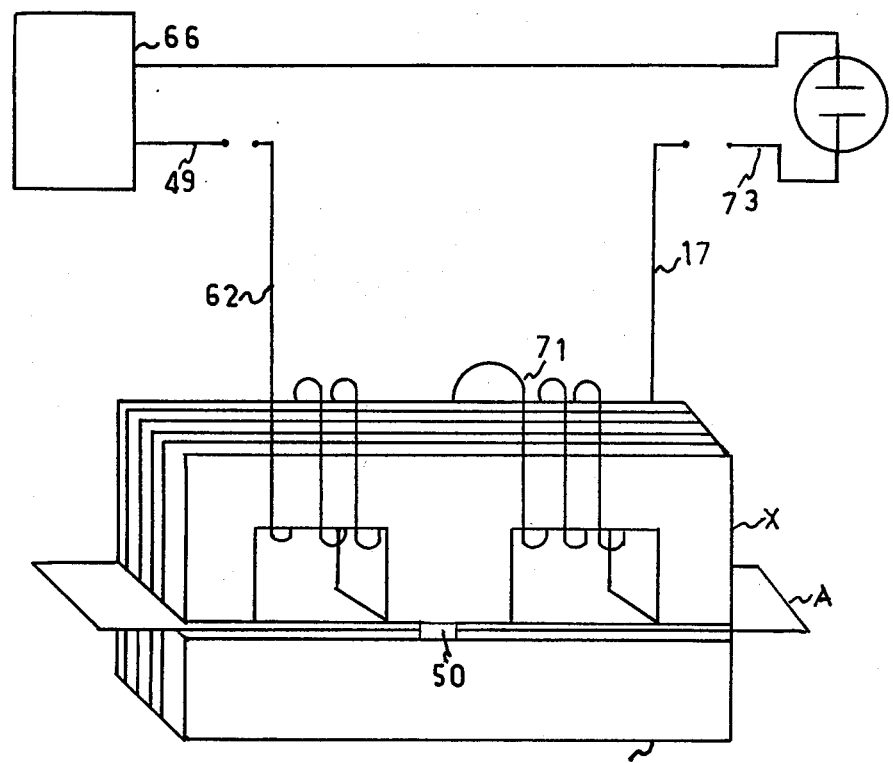
FIG. 8, is a schematic drawing illustrating the application of the innovative method in conjunction with the magnetic current control device adapted to function as a light switch and light dimmer simultaneously as it controls the increase and decrease of electrical current.

Describing now the internal operation of the M.C.P.C.D. either as a light switch or as a light dimmer, or as a normal switch on a circuit. See FIG. 8:

Terminals 17 and 62 are connected from one end to wires 73 and 49 thereby controlling either the connected electrical device 66 (operating on 120 v. 160 watts) or a lighting fixture. Line 17, extending from coil 71 carries the current to magnetic iron core (X), and as line 62 extends back to coil 71. Metal bar (Y) bridges the gap between the vertical sides of iron core (X) and assumes a position parallel to the base of the iron core (X). The magnetic field of iron core (X) generates a counter inductance which resists and expels the incoming current. Metal bar (Y) when turned fully, exposes the gap between the vertical sides of iron core (X) and assumes a position perpendicular to the base of said core, thereby advancing the full current proceeding from the power source.

Note, to use the M.C.P.C.D. as a switch or dimmer of a light, terminals 17 and 62 would be connected to the terminals of the light switch. To use the M.C.P.C.D. as a normal switch of a circuit or an appliance, terminal 17 would be connected to 73 and terminal 62 would be connected to 49.

We have thus far demonstrated by means of diagrammatic illustrations and related written description in FIGS. 1, 2, 3, 4 the application of the innovative method by means of the innovative M.C.P.C.D., and the innovative M.C.P.C.D. in accordance with the innovative method, the accurate control of the increase and decrease of AC current appliances and in AC operations.

In like manner, we have demonstrated by means of diagrammatic illustrations and related written description in Figures the application of the innovative method by means of the innovative M.C.P.C.D., and the innovative M.C.P.C.D. in accordance with the innovative method, the accurate control of the increase and decrease of DC current in DC appliances and in DC operations.

Figure 9:
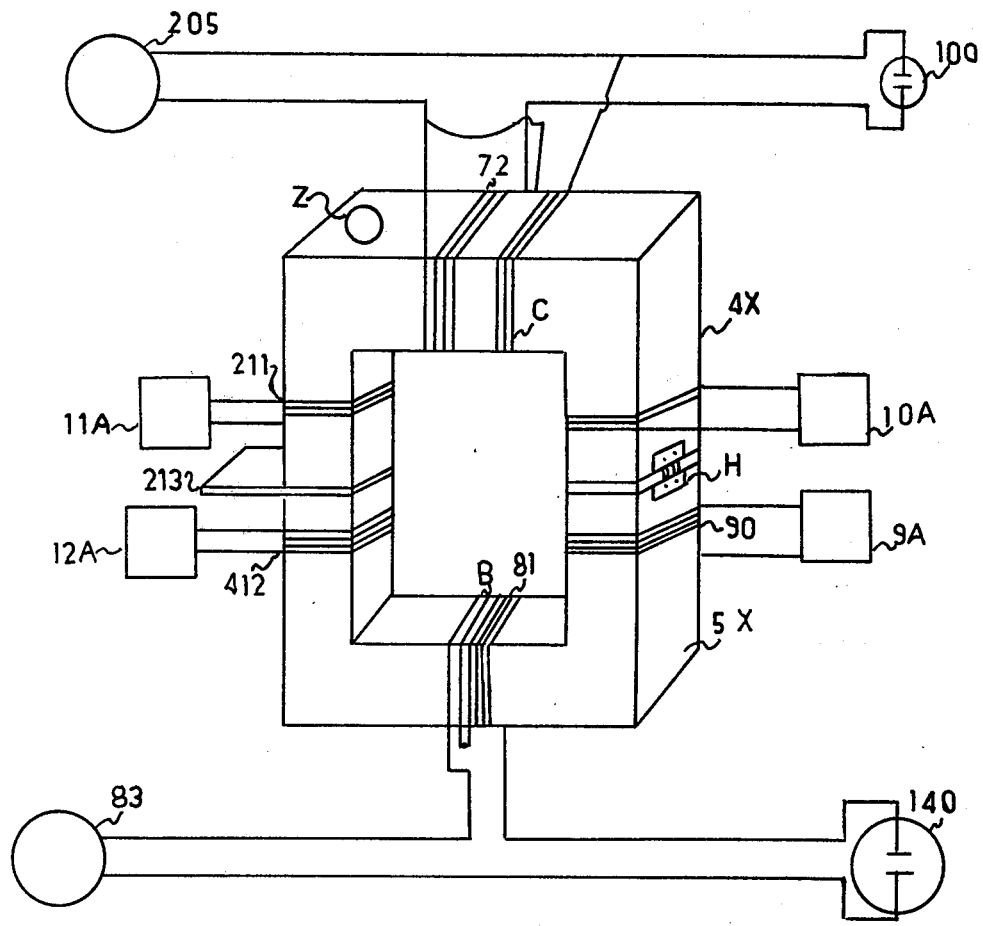
FIG. 9, is a schematic drawing illustrating the application of the innovative method in conjunction with the magnetic current control device adapted to function as a double magnetic control device.

Describing now the operation of an M.C.P.C.D. device adapted to control heavy machinery requiring increased current, simultaneously as it controls small electrical devices requiring decreased current. See FIG. 9:

Plug 100 is plugged into an energy source such as a wall outlet and current is passed on to light fixture 205. Plug 140 is plugged in to an energy source and current is passed on to light 83. Energized core 4X and 5X increase and decrease current.

The M.C.P.C.D. can be applied in other ways to increase and decrease current to supply the current requirements of divergent electrical appliances. For e.g., plug 100 and plug 140 can be reversed to set M.C.P.C.D. (4X) and M.C.P.C.D. (5X) out of phase 180 degrees, thereby creating a complete cancellation of the countermagnetic field, thereby increasing maximum electrical current proceeding from the energy source. Now when M.C.P.C.D. (4X) and M.C.P.C.D. (5X) are out of phase 180 degrees, screw Z is rotated the opposite way, so that M.C.P.C.D. (4X) and M.C.P.C.D. (5X) are positioned at a maximum distance from one another, separated from one another, then the reverse situation occurs, whereby a maximum decrease in current is produced in the circuit, which said decrease results from the reduction of the cancellation of the counter magnetic field, which said reduced cancellation of the counter magnetic field is caused by the act of separating M.C.P.C.D. (4X) from M.C.P.C.D. (5X), which said M.C.P.C.D. s, when previously unseparated had produced the cancellation of the counter magnetic field. Note, this circuitry adaptation operates in reverse to the cutomary operation of M.C.P.C.D.s. The customary operation of the M.C.P.C.D. is that when the said gap between the said vertical arms of the M.C.P.C.D. is uncovered, then the electrical current proceeding from the energy source is increased in the circuit. Whereas, in this particular circuitry adaptation of the M.C.P.C.D., when the gap between the vertical arms of the M.C.P.C.D. is uncovered, the electrical current proceeding from the energy source is decreased in the circuit. Note, the M.C.P.C.D. can be adapted in various forms and applied in different ways to cause a change in the open or closed status of the said gap between the said vertical arms of the magnetic iron core. For e.g., metal rod 213 can be placed between the gaps of M.C.P.C.D. (4X) and M.C.P.C.D. (5X) in such a manner, that when metal rod 213 is expanded to the said gaps, the said gaps are also expanded, which said expansion of the gap produces an immediate increase in the electrical current proceeding from the energy source. Also, when the expanding metal rod 213 is positioned in such a way that the expansion of the metal rod pushes M.C.P.C.D. (4X) closer to M.C.P.C.D. (5X), thereby diminishing said gap, the expansion of the metal rod in this position produces an immediate decrease in the electrical current proceeding from the energy source. Also, any metallic substance and object of such substance, similar to that of the metal rod 213, would cause a similar change in the open and closed status of said gap and in the increase and decrease of electrical current proceeding from the energy source.

Switches (9A) (10A) (11A) and (12A) are used as a booster of power for machines requiring increased current. By closing switch (9A) current of cores (4X) and (5X) are decreased thereby passing more current through coils 72 and 81. Also coil (B) and coil (c) are used as stabilizers, stabilizing the current to steady amperage.

It should be noted that by removing hinge H and switches (9A) (10A) (11A) and (12A) and by using coil 81 as an output while using coil 72 as an imput we can have the following additional functions: a portable plug which would differ from an ordinary light plug in that it would not be necessary to go the motions of plugging in the plug into the wall outlet and depressing the "on" and "off" switch each time a connected device is to be enabled. Simply, by placing core (5X) to connected core (4X) we obtain full light intensity to light 83 (or for any other connected ac device). The intensity of light 83 (or the speed of a connected ac device) can be made variable by placing core (4X) into close proximity to core (5X), with light intensity (or motor speed) increasing as core 4X comes closer to core (5X).

Note also, core (5X) and Core (4X) can be used as a portable power supply. A vacuum cleaner or radio for example, containing core (5X) wherein core (5X) has its open gap close to and facing the floor, while a connected core (4X) concealed beneath the floor, rug or table, eliminating thereby the need for wires to outlets that may be out of reach while eliminating the dangers of shock especially when hands are wet, since the appliance can be enabled simply by moving or placing the appliance containing (4X) over (5X).

Also, by connecting core (4X) to an amplifier output and connecting core (5X) to an amplifier input the same device can function as a volume control. By moving core (5X) closer or further away from core (4X) we would obtain the result of an increase or decrease in sound volume (or other electronic signal). Note that in the same set up with the addition of a high pick up amplifier would enable recieving sound through the air without the need for rf carriers. Also, by plugging in core (4X) into an amplifier output the speaker of the system would not have to be connected to the amplifier since the spaker has within it core (5X) which when it placed near core (4X) would transmit the sound into the spaker (which is connected to core (5X) without the requirement of an amplifier in the speaker system. Note that H is the hinge. Also, that fine tuning knob in conjunction with the meshing gear (not shown) serve to adjust the gap opening for precise decimal amperage control when such is required.

Describing now the internal operation of a M.C.P.C.D. adapted to control automatically the current input to a circuit or appliance and to maintain the current output at a constant level. See FIG. 10.

Plug (1) is plugged into a wall outlet. Two wires, wire 92 and wire 93 connected to the M.C.P.C.D., pass on current to the M.C.P.C.D. (15X), from the energy source. From line 92 current passes on to coil 94 then to wire 96 then to wire 84, leading to the reverse winding of the motor 77 and then to wire 91. From wire 91 current is passed to wire 93 and then back to the wall outlet of plug (1). The electrical circuit of the reverse winding R passing through wires 84 and 91 is now complete. Wire 92 supplies current to another circuit. From wire 92 the current passes to coil 551 of the M.C.P.C.D. (15X), then to wire 112, extending from the end of said coil 551 and then to wire 112, the forward winding F of motor 77. The said forward winding F leading to M.C.P.C.D. (15X), passes current to wire 101, then to wire 93, and then back to the wall outlet of plug (1). The circuit to the forward winding of the motor, passing through wire 101 and wire 112 is now complete.

Now motor 77 is so connected, that it is capable of running in the reverse, and motor 77 is so wired with high resistance wire coils that it will not burn out. Motor 77 has two windings, a reverse coil winding and a forward coil winding, which said windings are equally balanced, which said windings when plugged into opposite polarity, minus to plus and plus to minus, causes said motor 77 to stop at a standstill. Any change in one side of the motor 77 causes a change in the other side of the motor 77, the change being either reverse or forward motion.

This is how the M.C.P.C.D. operates in maintaining a constant power supply to the connected AC device 130 and AC device 114. Wire 92, extending from plug (1), feeds current into coil 551, from thence the current passes on to wire 101, which said wire 101 extends from coil 551 to AC device 114. Now the output from AC device 130 and AC device 114.

This completes the operation of passing current to AC devices 130 and 114.

Dial (21Z) and meter 223 work in conjunction with one another. When dial (21Z) is turned, a corresponding reading corresponding to the set dial, is set in meter 223. When dial (21Z) for example, is set to 1 ampere, a constant level of output of 1 ampere of current would be present in AC device 130 and AC device 114. When dial (21Z) for example, is set to 5 amperes, a constant level of output of 5 amperes of current would be present in AC device 130 and AC device 114. In like manner, any ampere level set on dial (21Z) would maintain a corresponding constant level of output to AC device 130 and AC device 114. Any ampere level set on dial (21Z) would correspondingly show a similar ampere level reading in meter 223. Meter 223 is connected over wire 84 and wire 91 which said wire 84 and wire 91 are connected over motor 77 to the reverse winding of the motor 77. Meter 223 displays the input to the said reverse winding, which shows the input to AC device 130 and AC device 114. Motor 77 stops at a standstill when the input device 130 and 114 are equal to the meter reading. When an overload is present in AC device 130 or AC device 114, or when more than usual amount of current are used by the circuit of device 130 and 114 an imbalance occurs. This imbalance causes changes in the forward winding F, the change being a decrease in current to said forward winding. The current now present in the reverse windings of the motor 77 is greater than the current present in the forward winding F. The greater current in reverse winding would cause motor 77 to rotate in the reverse direction, which in turn causes screw 17Z to turn counter clockwise, which in turn causes metal bar (16Y) of the M.C.P.C.D. to elevate, which in turn causes the withdrawal of a portion of the counter magnetic field about the magnetic iron core, which in turn causes an increase of current fed into AC device 130 and AC device 114. Now, when the current is increased to device 130 and device 114 the forward winding regains its lost current thereby equalizing the current and fed into forward winding which extend to wire 112 and wire 124 with the current fed into reverse winding which extend to wire 84 and wire 91 thereby balancing the motor and causing it to stop at a standstill. This explains how the balanced motor 77 connected to the M.C.P.C.D. maintains its balance. We shall now describe how the M.C.P.C.D. operates in balancing said motor 77. When the reading on dial (21Z) is changed a corresponding change occurs in the reverse coil winding R of said motor 77. Suppose dial (21Z) is changed from a reading of 1 ampere to a reading of 5 amperes. Then a greater amount of current would be present in reverse coil winding R than the amount of current present in forward coil winding F. The increase in current automatically elevates metal bar (16Y), to a height equivalent to 5 amperes, whereby 5 amperes is increased in the current of the circuit, whereby 5 amperes is increased in motor 77, thereby balancing the motor 77 and bringing it to a standstill. Suppose dial (21Z) is changed from a reading of 5 amperes to a reading of 1 ampere. Then a greater amount of current would be present in forward coil winding F than the amount of current present in reverse coil winding R. The increase in current automatically lowers metal bar (16Y) to a decrease in height equivalent to 4 amperes, whereby 4 amperes is decreased in the current of the circuit, whereby 4 amperes is decreased in the motor 77 thereby balancing the motor 77 and bringing it to a stand still. The current now passing through the circuit and motor 77 is at a 1 ampere level.

Figure 10:
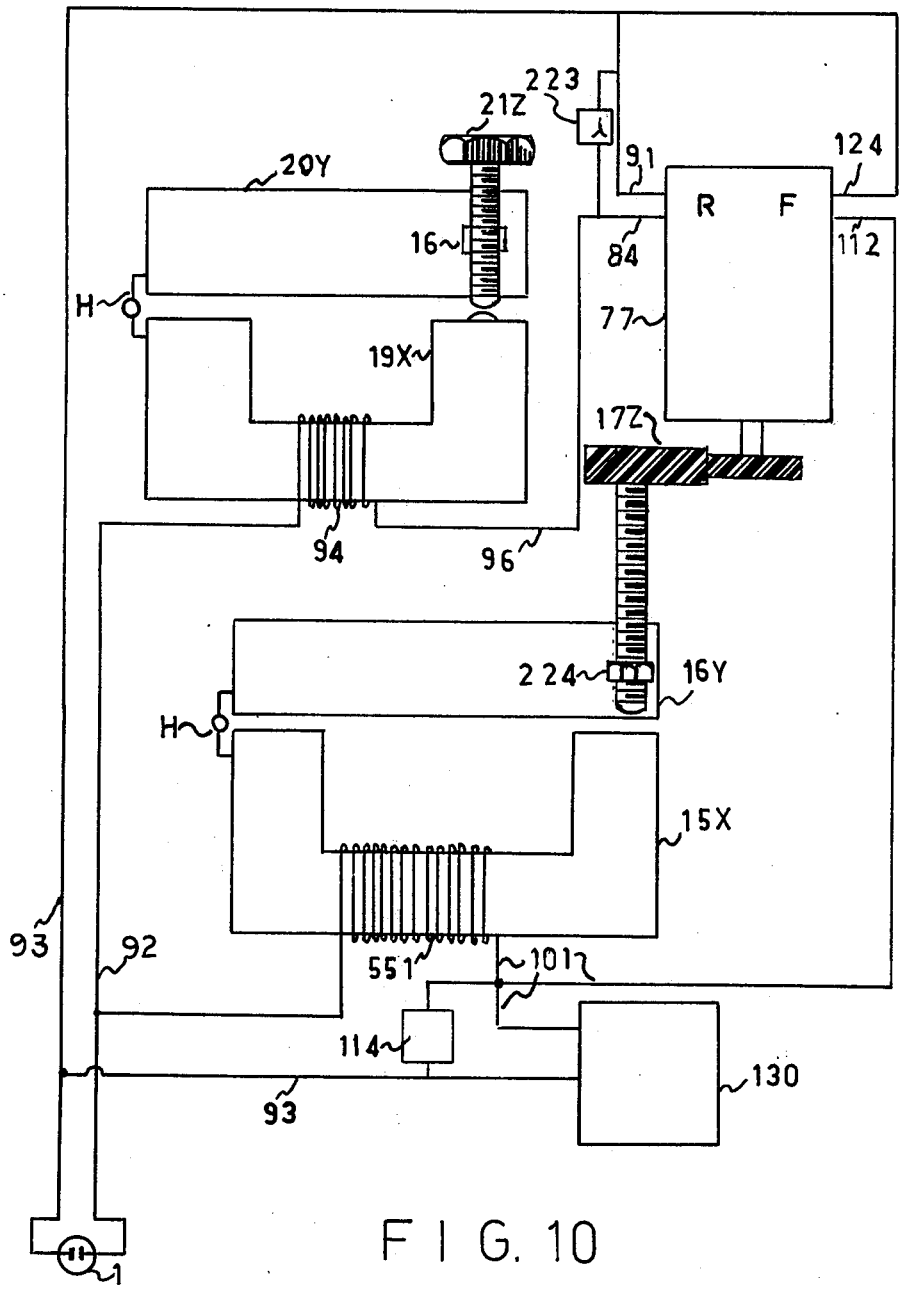
FIG. 10, is a schematic drawing illustrating the application of the innovative method in conjunction with the magnetic current control device adapted to control automatically the current output and to maintain the current output at a constant level.

Note, in FIG. 10, (19X) designates the magnetic iron core of the upper M.C.P.C.D.; (20Y) represents the metal bar that controls the increase and decrease of current to the upper M.C.P.C.D. of motor 77; 16 represents the nut that holds the screw (21Z) in a vertical position. In the lower M.C.P.C.D., 224 is the nut that holds the screw (21Z) in a vertical position. H is the hinge.

Describing now the internal operations of a M.C.P.C.D. adapted to control automatically the intensity of an AC lighting system: See FIG. 11.

The M.C.P.C.D. controls the intensity of light emitting from an AC lighting system in a particular location, in relation to the intensity of light entering the particular location from an external source. A decrease in the intensity of light entering the particular location from an external source, such as the sun's rays or other light, would automatically increase the intensity of light emitting from the lighting system. An increase in the intensity of light entering the particular location from the external source, such as the sun's rays or other light, would automatically decrease the intensity of light emitting from the lighting system. The preselected level of light intensity desired for the location, would be maintained at a constant level.

Figure 11:
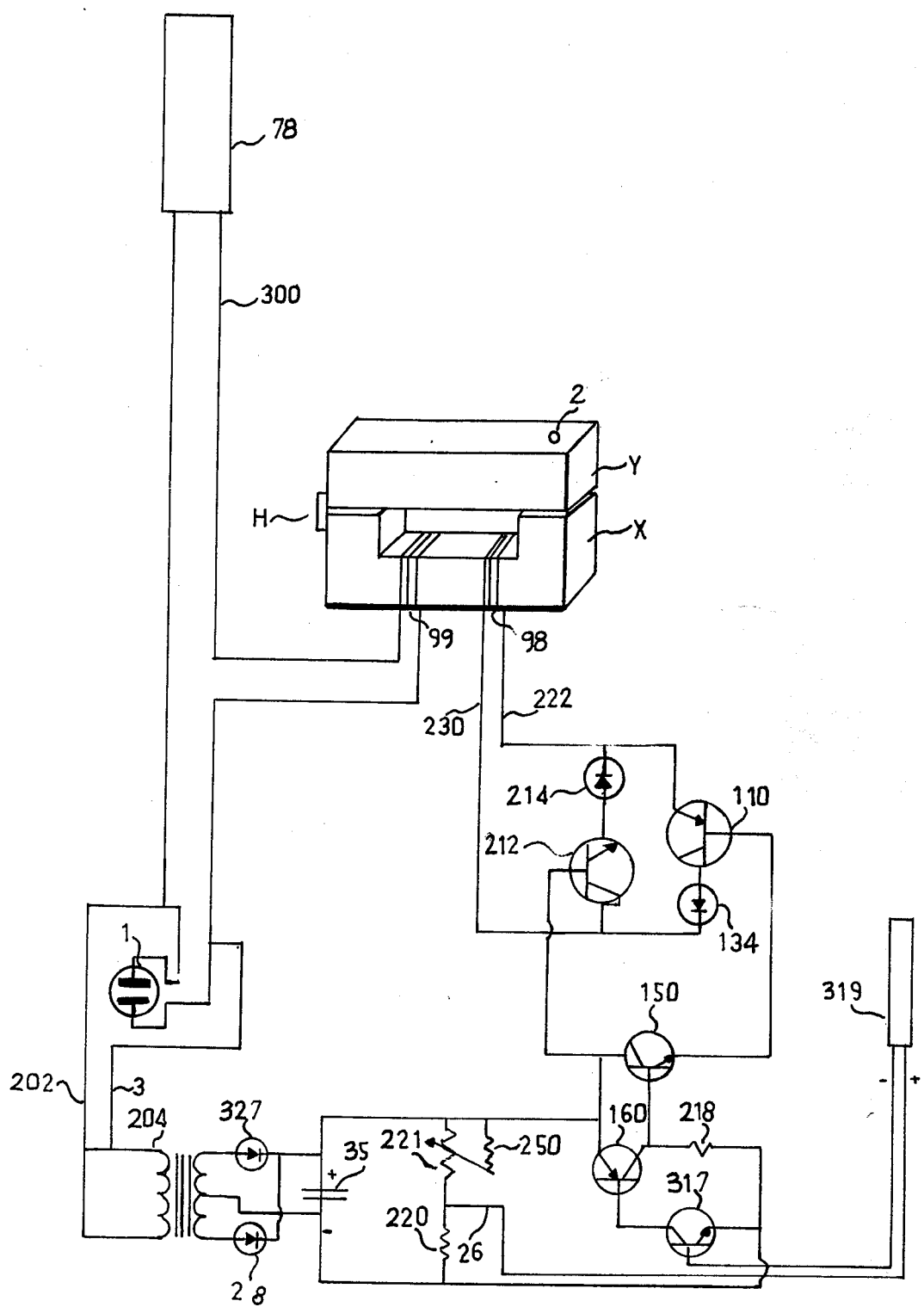
FIG. 11, is a schematic drawing illustrating the application of the innovative method in conjunction with the magnetic current control device adapted to control automatically the intensity of light and detecting the intensity of light, simultaneously as it controls the increase and decrease of electrical current.

In FIG. 11, plug (1) is plugged into a 110 volt AC wall outlet. Line 202 extending from plug (1) passes the current to the AC lighting system 78. Line 300 extending from plug (1) passes the current through to coil 99 wound around the magnetic iron core (X) of the M.C.P.C.D., and passes current on to coil 99 thereby creating a counter magnetic field, that counter inducts itself, and thereby inducting high resistance into coil 99. The current then passes on to the AC lighting system 78, completing the circuit. The M.C.P.C.D., consisting of (X) and (Y), can be adjusted to control the intensity of light emitting from the lighting system 78 by means of the knob Z which enables the elevation of metal bar (X), thereby advancing the current in the circuit, proceeding from the energy source, and increasing the light intensity of 78 the lowering of metal bar (Y), thereby expelling current from the circuit, proceeding from the energy source, and decreasing the light intensity. Note, that the sensitivity of the light sensitive cell could be adjusted to be, more or less, sensitive to incoming light of the light sensitive cell 319 by adjusting variable resistor 221 which pointer 250 is connected to a resistor so as to limit the amount of bias to the transistor 317. By reducing or increasing the resistance of resistor 221 there results an increasing or decreasing of the sensitivity of light sensitive cell 319. When the counter magnetic field induced by coil 99 is at maximum strength, lighting system 78 emits a light intensity close to zero strength. When the strength of the counter magnetic field induced by coil 99 is reduced to close to zero strength, the lighting system 78 emits a light intensity of maximum strength. When the coil 98 is short circuited a magnetic field is reinduced around metal core (X) which said magnetic field repels and cancels the incoming magnetic field, which in turn cancels the resistance in coil 99 thereby increasing to maximum strength the light intensity of 78. Now coil 98 could be shortcircuited automatically, partially or wholly, thereby adding or subtracting automatically the intensity of light from 78. The detection of the intensity of light entering the particular location from the external source, such as the sun's rays or other light, operates as follows: Two lines 202 and 300, extending from plug (1), pass current through an AC transformer 204 which creates a power supply for the electronic eye, which consists of transistor PNP 160 and transistor NPN 317 and light sensitive cell 319. An increase in the intensity of light proceeding from the external source and entering the light sensitive cell 319, increases respectively, the output of electricity from 319. A decrease in the intensity of light proceeding from an external source and entering the light sensitive cell 319 decreases respectively the output of electricity from 319. By connecting the positive pole to line 126 and the negative pole to the base of transistor 317 the output of light sensitive cell can be amplified to such an extent that automatic detection and control of the intensity of light are implemented. The light sensitive cell 319 converts light into electric current. Current is amplified by transistor NPN 317 which is sensitive to positive current. The transistor PNP 160 changes the bias of transistor NPN 150, which is sensitive to negative current, with no output from light sensitive cell 319. Transistor 317 emits a negative current which is further amplified at a higher level by transistor PNP 160. The output of transistor PNP 160 passes on to transistor NPN 150, a very high positive which causes the transistor to act as a short. When transistor NPN 150 acts as a short it produces bias for transistors PNP 110 and NPN 212, which shorts out coil 98, which in turn increases the light to maximum. In actual operation, with a high light input to the light sensitive cell 319, coil 98 is kept open, and with a low light input to the light sensitive cell 319, coil 98 is shorted. In like manner, an increase of intensity of light from close to zero, to maximum, would correspondingly increase the current in coil 98 from close to zero, to maximum. Light sensitive cell 319 cancels the positive bias from resistors 220 and 221, which is fed to transistor 317 NPN, through the light sensitive cell 319, thereby reducing the output of 317, 160, and 150, thereby releasing the short out over coil 98 through transistors PNP 110 and NPN 212, and thereby permitting resistance, created by coil 98 in the M.C.P.C.D. With a close to zero light input to light sensitive cell 319. the positive bias of resistors 220 and 221 which feed to transistor NPN 317 which in turn leads to transistors PNP 160, NPN 150, PNP 110, and NPN 212, would not be cancelled. The short out circuit operates as follows:

NPN transistor 150 leads into and is connected to a transistorized circuit which amplifies AC, an amplification which is not ordinarily performed by a transistor. The amplification acts like a short to the AC of coil 98. When the short circuit occurs, the magnetic field of coil 99 is cancelled, thereby increasing to maximum strength the intensity of light emitting from 78. Now a different situation exists when the AC cycle enters a negative phase. At this point, transistor NPN 212 becomes functional. Wire 222 which is negative, passes negative current to diode 214, then to the emitter of transistor NPN 212 which accepts negative current which flows to the collector of the transistor, which is positive, and then passes current back to wire 230, thereby completing the other half of the circuit. Now, when the base of transistor NPN 212 is increased to maximum strength, and virtually the entire supply of electricity flows into it, a short circuit is produced in the AC circuitry. Thus coil 98 is short circuited and the resistance stemming from coil 99 which is created by the magnetic field is also shortcircuited, thereby increasing to maximum the intensity of light from 78. The circuits operate in such a manner, whereby the base of transistor PNP 110, consistently outputs negative current, and the base of transistor NPN 212 consistently outputs positive current. Thus, when a short circuit is produced through the base that outputs negative current and through the base that outputs positive current, a maximum bias is present in regard to the two transistors, PNP 110 and NPN 212, which enables the passing of maximum current from coil 98 through transistors PNP 110 and NPN 212. The current for base PNP 110 flows from the base on NPN 212. These two bases, the base of NPN 212 and the base of PNP 110, are short circuited by transistor NPN 150, which receives negative current from transistor NPN 212 and positive current from transistor PNP 110, and short circuits them together. A return bias resistor is necessary from emitter of 110 to the negative of the power supply to return the bias current of transistor 150. The short circuiting by trnasistor 150 is performed in accordance with the intensisy of light passing into the light sensitive cell 319 whose output is amplified by transistor NPN 317. whose output in turn is amplified by 160 which passes the amplified output to trnnsistor NPN 150. If the output from transistor NPN 150 is high then the short circuiting of PNP 110 and NPN 212 is high. If the output from NPN 150 is low, then the short circuiting of PNP 110 and NPN 212 is low. When the intensity of light stemming from the external source, such as the sun's rays or other light, entering light sensitive cell 319 is decreased to close to zero, then light emitting from 78 is affected in the following manner: the cancellation of positive bias of resistors 220 and 221, which feed to transistor NPN 317, which in turn leads to transistors 160, 150, 110, and 212, would not be cancelled and would cause thereby a shortout in coil 98, thereby cancelling the resistance in coil 98. In like manner, this function operates when light input to the light sensitive cell 319 increases from close to zero to maximum.

Now the reverse occurs when the intensity of light stemming from the external source, such as the sun's rays or other light, and entering the light sensitive cell 319 is increased to maximum strength, light sensitive cell cell 319 cancels the positive bias from resistors 317 and 218 which is fed to transistor NPN 317 through the light sensitive cell 319, thereby reducing the output of transistors 317, 160 and 150, which in turn releases the shortout over coil 98 through transistors 110 and 212 thereby permitting the resistance, created by coil 99 in the M.C.P.C.D. When the resistance in coil 99 is increased the intensity of light emitting from 78 is decreased, Bias resistors 220 and 221 are employed in the biasing of transistor NPN 317. The levels of light intensity, from maximum to minimum, stemming from the external source and entering 319 are measured accurately. Correspondingly, they produce accurate levels of light intensity from maximum to minimum, which are emitted from 78. The intensity of light output from 78 depends entirely upon the intensity of light input into the light sensitive cell 319.

Figure 12:
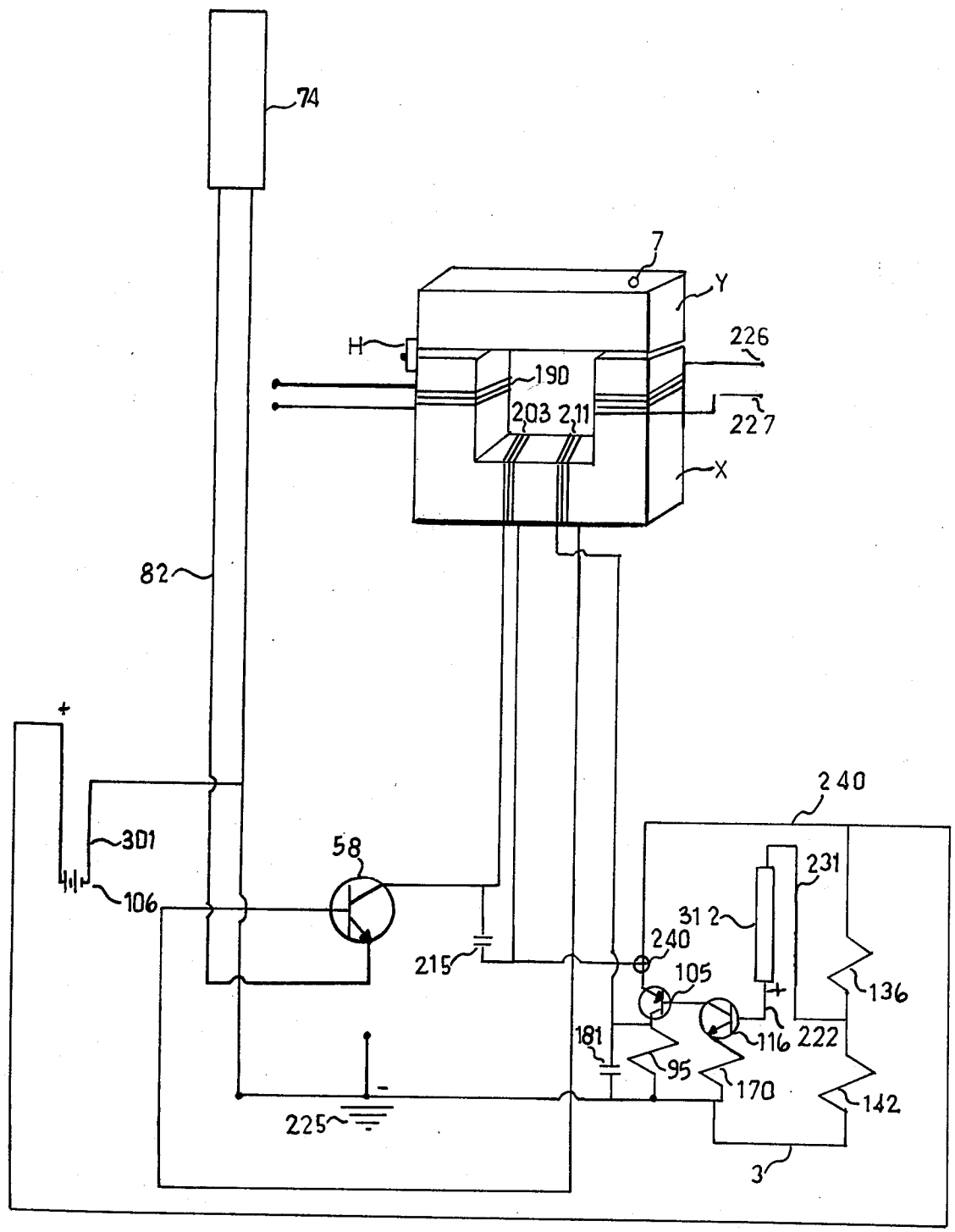
FIG. 12, is a schematic drawing illustrating the application of the innovative method in conjunction with the magnetic current control device adapted to control automativally DC devices, simultaneously as it controls the increase and decrease of electrical current.

Describing now the internal operations of the M.C.P.C.D. adapted to control automatically attached dc devices. See FIG. 12

Power from battery 106 passes to ground 225. Current is passed to transistors PNP 105 and NPN 116 through resistors 95 and 170. Current is passed also through resistor 142 to wire 231 providing the correct negative bias. Another circuit is one that passes through light 74 from wire 82 which passes current to the emitter of NPN transistor 58 through to coil 203 and to wire 240 which is the positive side of battery 106. Transistor 105 and 116 are also connected to wire 240 leading to the positive terminal of battery 106 thereby completing the circuit. Resistor 142 136 connected to wire 240 supplies the amount of positive balance for the bias. When oscillator 58 and its components 203, 211, 215, 181, 95 105 causes oscillation at its highest level of current drain light 74 is fully on. For example, if its highest drain is at 1000 cps (cycles per second) then any change, for example to 800 cps or below would cause a reduction in current as compared to 1000 cps. Current is increased or decreased either by changing the level of bar (Y) by adjusting knob Z or controlled automatically by light sensitive cell 312 circuitry. When knob Z is adjusted so as to create a gap in core (X) hence oscillation from our given example of 1000 cps to 1200 cps for example also decreasing. This action results in reducing the current drain through the oscillator as well as to light 74 thereby reducing the light brightness. A reduction in light brightness would also occur when the bias of transistor 58 is decreased or increased. Such is accomplished by transistor 105 and resistor 95 which when balanced would produce a certain level of light. A similar level of light intensity can also be atained by adjusting knob Z. When light enters light sensitive cell 312 it causes an increase of positive bias to the bias of resistors 136 and 142 biasing transistor 116. Such increase causes in turn an overall increase in current through transistors 105 and 58 connected through coil 211 causing increased oscillation hence adjusting the light level to a specific intensity. Such adjustments are obviously quite useful in that they serve in providing light as needed and increasing or decreasing in relation to such need. When a high amount of light enters light sensitive cell 312 it causes the oscillator to increase oscillation (to 1200 cps in our example) hence inducing a shut off effect on light 74 as it uses minimum current. If a medium amount of light enters light sensitive cell 312 this would cause a downward adjustment in oscillation (to about 1100 cps for example) resulting in a medium light level on light 74. On the other hand, if no light enters light sensitive 312 this would result in keeping oscillation steady (at about 1000 cps in our example) causing maximum light intensity of light.

Figure 13:
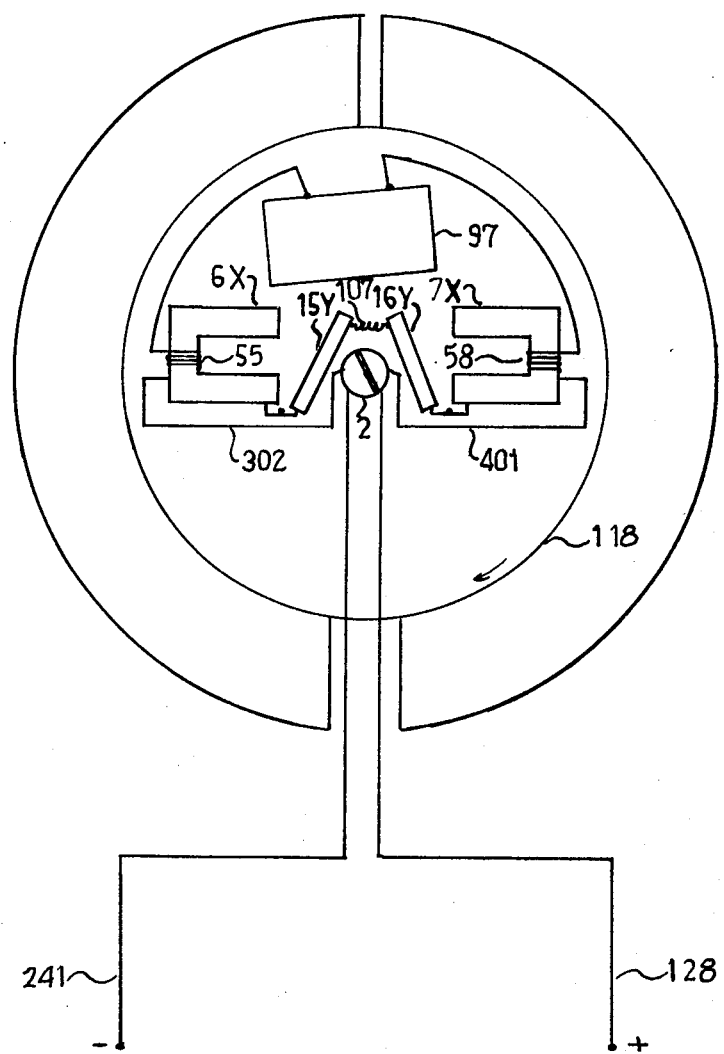
FIG. 13, is a schematic drawing illustrating the application of the innovative method in conjunction with the magnetic current control device adapted to control the of speed of motors by utilizing centrifugal force acting on the equipment, simultaneously as it controls the increase and decrease of electrical current.

It should be noted, that when a light is connected to its own power supply in a series connection with coil terminals 226 and 227 whereby an increase in oscillation would cause a corresponding increase in current through said light connected to terminals 226 and 227. When the oscillator has as its highest output 1000 cps, an output of 1200 cps or 800 cps would reduce light intensity of the light connected to terminals 226 and 227. A battery as a power source connected in series resulting in a series circuit of said light, battery and terminals 226 and 227 with current from the battery acting as a bias to increase it from a certain level. One advantage of this series circuit lies in the fact that should a short or overload occur therein this would not burn out or overload the oscillator and its light sensitive cell circuitry. The terminals of coil 190 are used for an additional series connection. Describing now the internal operations of the M.C.P.C.D. utilizing centrifugal force, enabling the operations of a centrifugal motor speed control device. See FIG. 13.

By utilizing centrifugal force the M.C.P.C.D. can be adapted to control the speed of motors. Among the advantages in utilizing the present control over the centrifugal switch currently in use are as follows: (1) Current to the motor is not completely cut off during operation (2) sparks are not generated; in contrast sparks are generated at the contacts of present centrifugal switches (3) motor speed is controlled by a gradual increase or decrease of current as opposed to sudden increases and decreases of current that occurs when utilizing ordinary centrifugal switches (4) because sparks are not generated, this eliminates the major cause of radio reception interference and spark gap burn out.

In operation, iron cores $6x$, $7x$ and bars $15x$ and $16x$ are mounted on the armature of a motor. Current is fed from negative pole 241 of the power source to the brushes (2). Wire 302 carries the current passing it on to coil 55 of core $6x$ to armature coil 97 to coil 88 of of core $7x$ to wire 401 to brush 2 and positive wire 128. As the motor revolves centrifugal force acts on bars $15y$ and $16y$ to throw them towards cores $6x$ and $7x$ thereby closing their respective gaps, hence reducing current to the motor, resulting in reduced speed of armature 118 of the motor.

As motor speed is reduced, bar $15y$ and bar $16y$ are pulled gradually away from cores $6x$ and $7x$ as a result of the action of spring 107 resulting in increased speed of the motor. The action just described is repeated enabling the action of the M.C.P.C.D. as a centrifugal motor speed control.

It should be noted that electrical pulses created by brush 2 as a result of the cut across its center is similar to the action of an oscillator in that it creates oscillations, hence creating the magnetic field in cores $6x$ and $7x$.

Note also, that since brush (2) produces pulses this enables core $6x$ and $7x$ to increase or decrease current to the dc motor without any additional oscillation.

Figure 14:
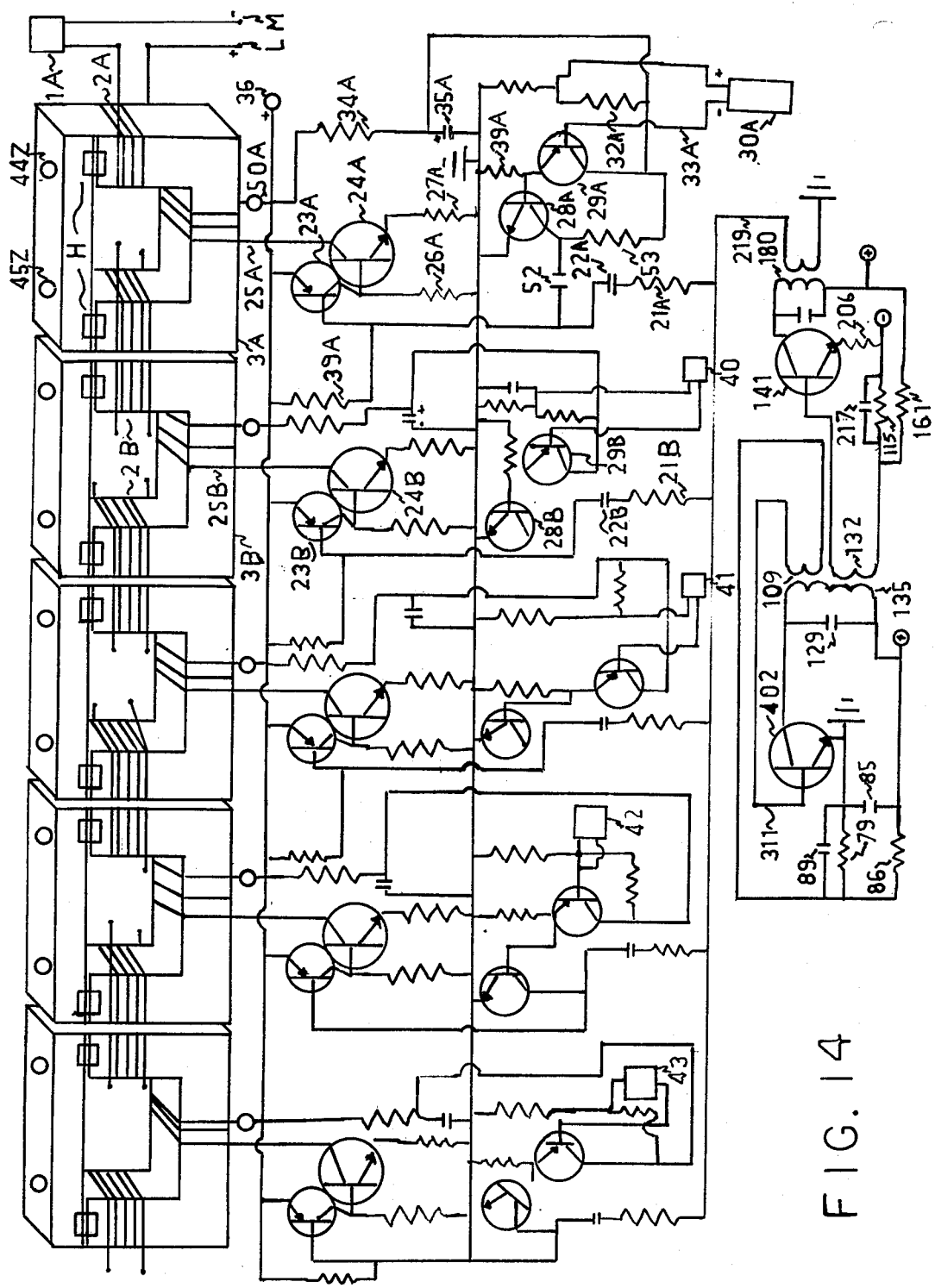
FIG. 14, is a schematic drawing illustrating the application of the innovative method in conjunction with the magnetic current control device adapted to function as a resistor, simultaneously as it controls the increase and decrease of electrical current.

Defining now the operations of a multiple M.C.P.C.D. adapted to control the functions of attached dc devices operating in a single oscillator by the use of amplitude modulation. See FIG. 14.

An oscillator having components consisting of transistor 402 coil 135 resistors 86, 79 capacitors 85, 89 coil 109 wire 311 and capacitor 129 oscillates creating a signal of 1000 cycles per second (cps) in our example. The signal is passed on to coil 132 and across transistor 141 resistors 115, 161 coil 180 and its resonate capacitor. The signal is then amplified and passed to wire 219 across resistor 21A and 21B to capacitor 22A and 22B to the base of transistor 23A and 23B. The current of transistor 24A passes from the negative ground wire across resistor 27A across transistor across coil 25A to dc device 50A and to positive wire 36 thus completing the circuit.

Note that with no oscillation in coil 25A the resistance throughout the circuit of 24A and coil 25A is quite low in relatiion to the resistance of the 1000 cps present in coil 25A. The drain with no signal can be adjusted to any level by changing the bias of transistor 23A. Once a level is chosen, current passes through circuit so as to increase or decrease current to the dc device 50A. The increase and decrease of current to dc device 50A can be accomplished in two ways: (1) by adjusting 442 and 452 of bar Y thus enabling more or less amplification of the 1000 cps signal; whereby when bar Y is raised fully by an adjustment of 442 and 452 more current is passed to dc device 50A. When bar Y is lowered it will increase amplification of the 1000 signal, reducing current to dc device 50A (2) by the electronic circuitry of trnasistors 29A and 28A, wherein transistors 29A and 28A shorts the original 1000 cps signal as follows: If light sensitive cell 30A having a high level output this would short out the 1000 cps signal through capacitor 52, while a medium output of 30A causes a partial reduction of signal stemming from capacitor 22A. This action thus causes an increase or decrease of current to dc device 50 A. This can be further explained as follows: Resistor 53 being balanced with transistor 28A, hence the signal stemming from capacitor 22A has little loss of signal, the signal passing on immediately to the base of transistor 32A. However, with an increase in current, transistor 28A acts as a short taking the signal from capacitor 22A and grounding same causing a reduction in signal. With a reduction in signal across transistor 23A there is also a reduction in signal across transistor 24A resulting in decreased oscillation, hence increased current. When the signal is at maximum level we get lowest current to do device 50A while when the signal is at lowest level, we get maximum current to dc device 50A.

DC device 1A operates as follows: L and M are connected to a dc power source. This dc source is so chosen to provide only a minimum desired current level. When oscillation occurs in the core of M.C.P.C.D. 3A it serves to increase current to dc device 1A by adding additional current to the level of dc supply to wires L and M. By reducing oscillation it serves to reduce current to its mimimum level.

All the circuits of the remaining four M.C.P.C.D.s function similarly as that of the M.C.P.C.D. 3A just described. The advantage being in that each M.C.P.C.D. can be adjusted individually; each controlled by its own electronic circuitry; each adjusted simultaneously by changing the oscillation signal flowing to coil 13. When the frequency of oscillator 4 and its components is lowered the current across all connected devices (40-43) will simultaneously increase.

The M.C.P.C.D., in this illustration, is also adapted in another way, whereby a light sensitive cell (30A) is connected to (40), (41), (42) and (43). All the M.C.P.C.D.s would therefore act according to the changes in the light sensitive cell (30A) and would act in unison, however different devices, can be hooked up to the M.C.P.C.D.s. For example, a radar detector device hooked up would be connected to (40); a microphone hooked up to (41); a thermo-resistor to (42); a thermostat to (43). 442 and 452 are the adjusting used to set M.C.P.C.D.s at a certain level.

Describing now the adaptation of the M.C.P.C.D. to function as a sensitive scale, to measure accurately the weight of extremely heavy objects as well as the weight of very light objects. See FIG. 15.

Hinge (H) is fastened to the magnetic iron core (X) of the M.C.P.C.D. and fastened to platform 43, which said platform is contructed of non-magnetic material, in such a manner, that both ends of platform 43 ascend and descend freely. By placing accurate weight measurements on platform 43 the positions of such weights when the platform descends, are marked on the adjustable meter 64. In such manner, meter 64 is calibrated to measure weight of extremely heavy objects or extremely light objects, which said weight is proportionately related to the proproption of the descent of platform 43. A heavy object, for example, would descend 10 times as far far down as a light object, 1/10th of said heavy object's weight. Hence, when an unknown weight 75 is placed on platform 43, metal bar (Y) of the M.C.P.C.D. would be forced open, thereby exposing the gap and causing a change in oscillator and voltage detector 56, thereby causing a reading on meter 64. It should be noted that the size of the M.C.P.C.D. and the size of the said platform, has a direct bearing on the sensitivity of the weight measurements desired. Whereas a larger M.C.P.C.D. would be used to measure heavier objects, in terms of tons and pounds, a smaller M.C.P.C.D. would be used to measure lighter objects, in terms of pounds and grams. Also, the M.C.P.C.D used to measure heavier objects would proportionately have a larger platform area as compared to a M.C.P.C.D. used to measure lighter objects, having a smaller platform. It should be noted, that for extreme accuracy in weight measurement, positions of weight placement on platform 43 can also be plotted as opposed to a single end position, ordinarily used.

Figure 15:
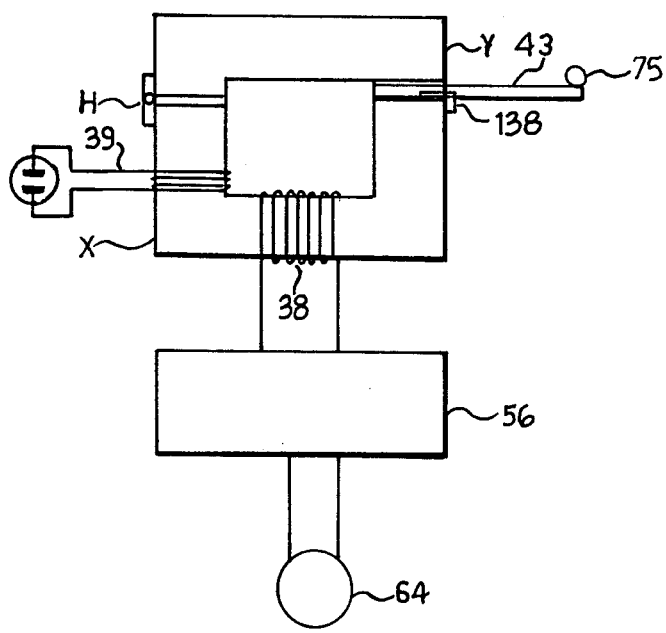
FIG. 15, is a schematic drawing illustrating the application of the innovative method in conjunction with the magnetic current control device adapted to function as a sensitive scale, simultaneously as it controls the increase and decrease of electrical current.

As illustrated in FIG. 15, plug 39 is plugged into an AC outlet. When weight 75 is placed on platform 43, the weight of 75 causes an opening of the gap in the M.C.P.C.D., thereby causing a change in oscillation of the oscillator and voltage detector through coil 38 of the M.C.P.C.D., thereby changing the oscillation of the oscillator and voltage detector, and the output of coil 38 connected to it. Oscillator and voltage detector 56, acting as an FM discriminator, operate in the following manner: A tundd circuit, meaning one whose IF is tuned to its oscillator by changing its frequency, detunes itself. The said detuning causes a proportionate loss of voltage, hence changing the base circuit of a transistor located within the housing of the oscillator and voltage detector 56, hence producing a reading on the calebrated meter 64. Thus the slightest movement of metal bar Y, pivoted on hinge (H), resulting from a corresponding movement of platform 43, causes a change of tuning. Such a change of tuning is amplified by voltage detector 56 which detects said change through the oscillator and provides a more accurate measurement of minute weight. The voltage detector acts as an FM discriminator, whereby a change in frequency in the tuning of the M.C.P.C.D. correspondingly reduces the voltage. When the frequency is returned to the correct tuning of the IF, it causes an increase of voltage, which said frequency voltage change is reflected as a reading on meter 64. Adjustments come about, when determining calebrations, by means of the rheostat extending to meter. 138 which is the platform hinge.

Describing now the internal operations of the M.C.P.C.D. adapted as functioning as a relay to open and close circuits, and as a voltage selector and dialing mechanism. See FIG. 16.

The M.C.P.C.D., shaped as a rotary device, has three different magnetic iron cores, (3X),(4X), and (5X), and one same metal iron bar (1Y), which said metal bar is constructed wide enough to cover all the said magnetic iron cores (3X), (4X), and (5X) at one time. Each magnetic iron core has its own coiled wire windings, which can be used independently of the other coiled wire windings or on cojointly with the other coiled wire windings. When metal bar (1Y) is rotated in such a manner as to cover all the magnetic iron cores (3X),(4X), and (5X), simultaneously, all the connected circuits are completely closed, thereby preventing current from passing into these said circuits. When metal bar (1Y) is rotated in such a manner as to uncover all the magnetic iron cores (3X),(4X), and (5X) simultaneously, all the connected circuits are completely open, thereby allowing current to pass into these said circuits. When metal bar (1Y) is rotated to cover only one magnetic iron core, either (3X) or (4X) or (5X), only one circuit is closed and two circuits are open. When metal bar (1Y) is rotated to cover two magnetic iron cores, either (3X),(4X) or (4X),(5X) two circuits are closed and only one circuit is open. Wire (7) is connected in series, when wire (7) is connected to wire (9) and to wire 511). Wire 110) is connected in series, when wire 110) is connected to wire (8) and wire (6). When magnetic iron core (5X) is connected in series, wires (6),(7),(8),(9) 110 and 511 are connected in the manner illustrated in FIG. 16. When (5X) is connected in series to (3X) and (4X), all the said magnetic iron cores will have a much higher resistance, as the individual resistances would be added to one another. When (5X) is connected in series to (3X) and (4X),(5X) can be employed to operate an electrical appliance requiring a high resistance, such as an electrical fan. Also, when (5X) is connected in series to (3X) and (4X), (5X) can be employed in the same manner as a current resistor. Also the same M.C.P.C.D. can be employed to operate divergent electrical appliances, each appliance requiring different ohmage inputs. For example, a heavy motor requiring a high ohmage input may be operated by connecting wires (6),(7),(8),(9), 110) and 511) to one another, without connecting any other electrical appliance to any of the said wires. Also, the same M.C.P.C.D. can be applied as voltage selector by rotating metal bar (1Y) over magnetic iron cores (3X),(4X) and (5X), simultaneously or independently. For example: When a voltage of 110 volts is desired, metal bar (1Y) is rotated in such a manner as to cover only two magnetic iron cores, thereby closing only two circuits, and leaving one circuit open. Each magnetic iron core enables 110 volts. When a voltage of 220 volts is desired, metal bar (1Y) is rotated in such a manner, as to cover only one magnetic iron core, thereby closing only one circuit, and leaving two circuits open. When a voltage of 330 volts is desired, metal bar (1Y) is rotated in such a manner as to uncover all the magnetic iron cores, thereby leaving all three circuits open. When all the 4 coils are connected together, the ohmage, 10,000 ohms for each coil, are multiplied by 4 thus achieving a total ohmage of 40,000. This said connection is a series connected. However, when the 4 coils are connected together in parallel, the ohmage, 10,000 ohms for each coil, are devided by 4, thus achieving a total ohmage of 2,500.

Note this feature of increasing the total ohmage in the circuitry, by connecting the coils in series, and decreasing the total ohmage in the circuitry, by connecting the coils in parallel, is present in all the M.C.P.C.D.s having a "U" shaped magnetic iron core. The increase and decrease of voltage is regulated accurately by either adding on additional connected coils or by subtracting available connected coils. For example: A tenfold increase in ohmage or voltage can be achieved by connecting 10 coils together in series, each one of the ten coils having the same amount of ohmage or voltage. A tenfold decrease in ohmage or voltage can be achieved by connecting 10 coils together in parallel, each one of the ten coils having the same amount of ohmage or voltage.

Also the versatile rotary shaped M.C.P.C.D. can be applied to adjust energy outputs of wall outlets to suit the energy requirement of the electrical appliances. For example: a wall outlet providing 220 volts, as those found in many European countries, can be used to supply the energy needs of an electrical appliance requiring only 110 volts, without damaging the said electrical appliance. The electrical appliance of 110 volts is connected to the M.C.P.C.D. at one end of the M.C.P.C.D. and the wall outlet of 220 volts is connected at the other end of the M.C.P.C.D. The metal bar (1Y) is regulated to rotate in such a manner, that two magnetic iron cores are covered, thereby closing the circuits of these two magnetic iron cores, and that one magnetic iron core is uncovered, thereby opening the circuit of this one magnetic iron core. Each magnetic iron core has 110 volts. Thus only 110 volts will flow from the 220 volt wall outlet into the 110 volt electrical appliance.

Figure 16:
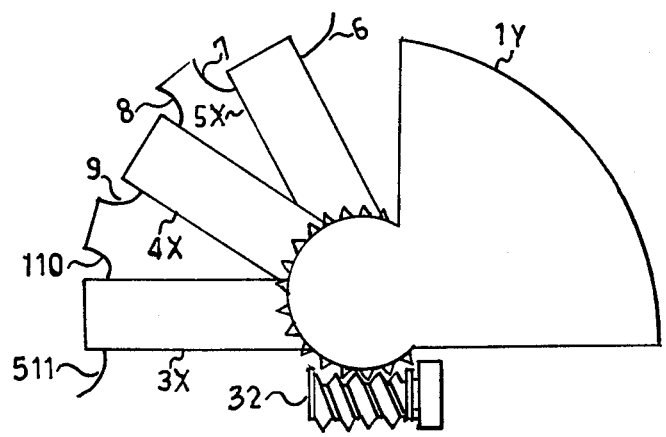
FIG. 16, is a schematic drawing illustrating the application of the innovative method in conjunction with the magnetic current control device adapted to function as a relay and voltage regulator, simultaneously as it controls the increase and decrease of electrical current.

It should be noted that the M.C.P.C.D. as shown in FIG. 16 can be utilized as a switch in a dialing system by rotating bar (1Y) over core (3X) and (4X) and (5X). When bar (1Y) is released it moves to its original position shown in FIG. 16 by spring action (not shown). Such movement causes a dialing action result by inducting a voltage over iron cores (5X) (4X) and (3X) representing numbers 1-3 on a telephone dial as bar (1Y) moves off said cores one after the other. Understandably, the same principle can be applied for any number of consecutive numbers or a dial as the iron cores representing such numbers would be similarly increased with bar (1Y) so constructed to cover all of the cores.

Figure 17:
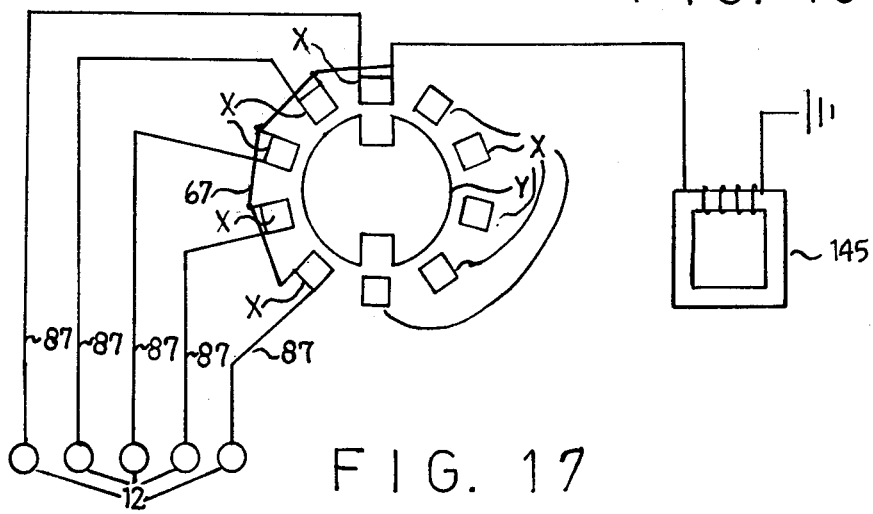
FIG. 17, is a schematic drawing illustrating the application of the innovative method in conjunction with the magnetic current control device adapted to function as a distributor, simultaneously as it controls the increase and decrease of electrical current.

Describing now the the internal operations of the M.C.P.C.D. adapted for functioning as a distributor for sparking gasoline or diesel engines; also functioning as a tuner. See FIG. 17.

Metal bar (Y) of the M.C.P.C.D. is so constructed that it will alow current to pass only to one out of the five U shaped magnetic iron cores (X), one at a time, thereby impelling current into the other part of the M.C.P.C.D., as the M.C.P.C.D. is rotated about a series of its U shaped magnetic iron cores (X). Each U shaped magnetic iron core (X), is wired, on one side, to spark plugs or other ignition means for allowing a spark to pass only to the select plug, at a select time, as bar (Y) rotates about the series of its U shaped cores (X). The other side of the said U shaped cores (X) are wired to high voltage medium, such as an ignition coil or an auto transformer 145. Wire 67 is represented in this figure as the input voltage line carrying current from the energy source. Wire 87 represents the output line extending from the M.C.P.C.D. having five U shaped magnetic iron cores (X) and metal bar (Y), to the ignition medium, such as the spark plugs 12. Note that the method employed in said M.C.P.C.D. is identical to that of the other M.C.P.C.D.s described in this application, Employed as a distributor, the M.O.P.C.D. impels current through the iron core (X) positioned at the open gap, while it expels current from the other four magnetic cores positioned at closed gaps. It should be noted that metal bar (Y) can be so constructed as to ignite a plurality of plugs simultaneously, by making the desired number of gaps in the said M.C.P.C.D. or by stacking numerous M.C.P.C.D.s appropriately wired. The advantages offered by such a device as a distributor is that it serves to eliminate static interfering with reception usually caused by sparks resulting from the opening and closing of switching contacts. Another way in which a plurality of plugs can be simultaneously ignited, is by wiring each M.C.P.C.D. with separate coils for each spark plug.

Functioning as a tuning device, to tune in electronic signals whereby the open gap having no resonance to a specific circuit would enter the specific signal into an ampliphier while rejecting all those signals which will resonate due to the closed gaps of the cores (X). Thereby in television, for example, the M.C.P.C.D. will enable the tuning into one channel while rejecting others. Note this device will also operate whereby all the gaps of core (X) are kept open while one gap is closed thereby resonating the signal into the amplifier.

Describing now the internal operations of the M.C.P.C.D. adapted as a switching device for functioning as a brushless motor. See FIG. 18:

Metal bar (Y) revolves in circular fashion to open and close circuits by impelling current through the M.C.P.C.D., consisting of (Y),(9X) and (8X), and by expelling current from said M.C.P.C.D. Metal bar (Y) is positioned directly opposite the empty space located between a set of teeth of the magnetic iron core (9X) and (8X), thereby uncovering a gap, which said uncovering of a gap reduces the counter inductive magnetic force, thereby impelling current through the M.C.P.C.D. (Y)((9X) and (8X). When metal bar (Y) is positioned directly opposite the teeth of the magnetic iron core (9X) thereby covering a gap, which said covering of a gap produces the counter inductive magnetic force, thereby expelling current through the M.C.P.C.D.(Y)(9X). The counter inductive magnetic force is produced in the M.C.P.C.D. when current is supplied in wire coil 411 which said wire coil is wound around magnetic iron core (8X). Thus when metal bar (Y) counter inducts current into magnetic iron core (8X), the incoming current passing through magnetic iron cores 44 and 57 is eliminated simultaneously as current is advanced into magnetic iron core (9X), via wire 128. Current advancing through wire 128 energizes magnetic iron cores 34 and 65, thereby attracting to magnetic iron cores 34 and 65, armature bar 76. When armature bar 76 is attracted to magnetic iron cores 34 and 65 as current is inducted into magnetic iron core (9X) thereby energizing magnetic iron cores 34 and 65 simultaneously as it deenergizes magnetic iron cores 44 and 57. This process of energizing and deenergizing, inducing and reducing, expelling and impelling is continoulsy repeated thereby enabling the M.C.P.C.D. (Y)(9X) and (8X) to function as a brushless motor, that is it operates as a switch in a motor without making or breaking contact.

Figure 18:
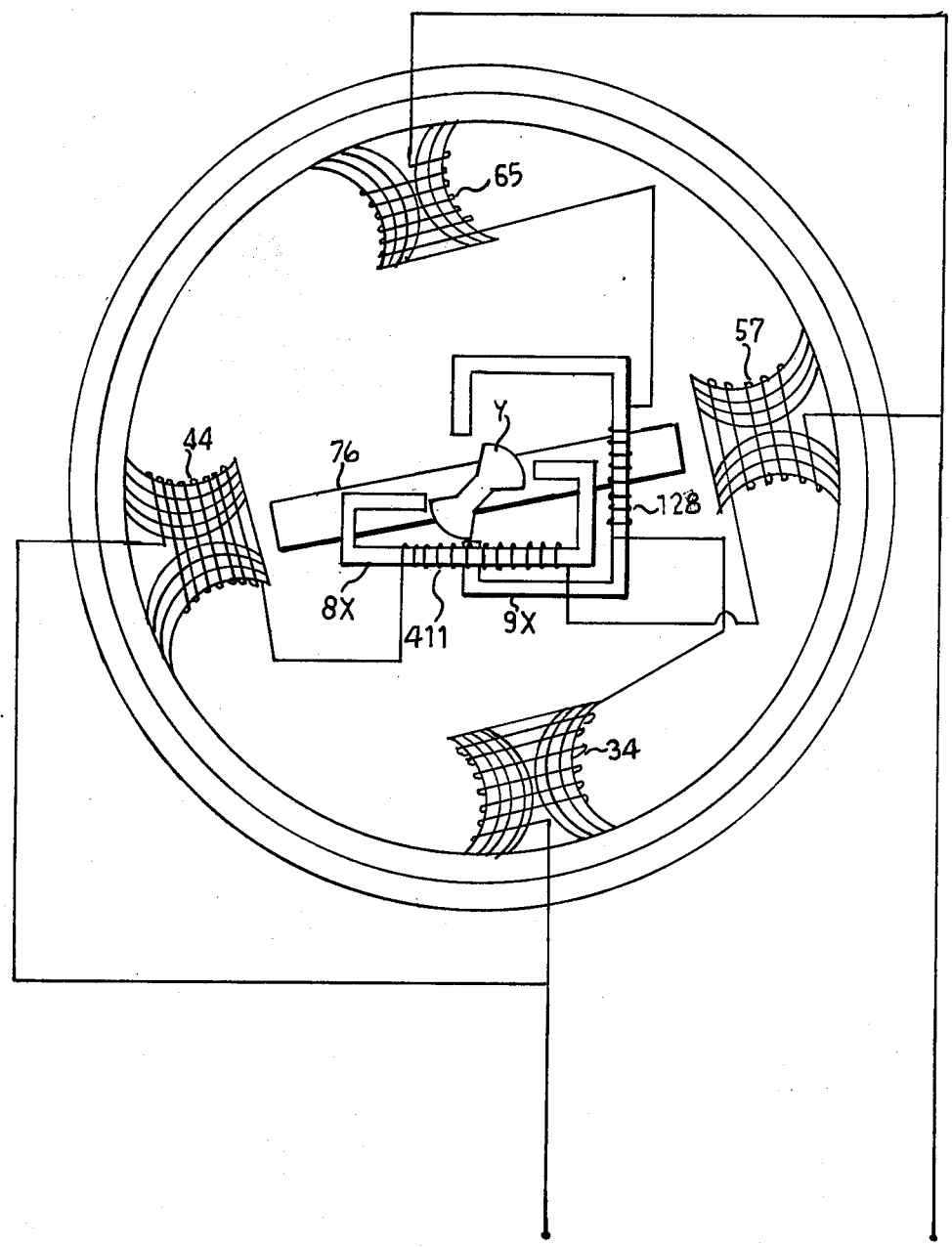
FIG. 18, is a schematic drawing illustrating the application of the innovative method in conjunction with the magnetic current control device adapted to function as a brushless motor, simultaneously as it controls the increase and decrease of electrical current.

Describing now how the brushless motor described in FIG. 18 operates on numerous coils. See FIG. 19.

The brushless motor operates as follows: The armature of the motor, consisting of components 125, 139, 149, 159, 162, 179, 189 and 199 is constructed in the following manner: 159 and 199 are both end segments of a unified, single, metal bar, which said bar is connected to center piece 201. Similarly constructed as end segments of a unified, single, bar, which said bar is connected to the center piece 201, are the following: End segment 149 and end segment 189; end segment 139 and end segment 179; end segment 125 and end segment 162. When metal bar (Y) is positioned directly opposite the empty space between any two sets of teeth of the magnetic iron core (X) current is impelled from the M.C.P.C.D. When metal bar (Y) is positioned directly opposite any of the sets of teeth of the said magnetic iron core, current is expelled into the said M.C.P.C.D. For example: when coils 502, 504 and 506 are energized, coils 502, 504, and 506 cause the metal protrusions around which they are wound to become magnetized, thereby attracting end segment 179 and rotating end segment 179 of bar 179 towards coil 502; thereby pulling along and rotating end segments 162 towards coil 504; and thereby pulling along and rotating end segment 159 towards coil 506. Now end segment 179 and end segment 139 are end segments of the same unified, single metal bar. Hence when end segment 179 moves toward coil 502 on one side of the motor, end segment 139 automatically moves toward coil 502 which said coil is located at the opposite side of the motor. Likewise, when end segment 162 moves toward coil 504 on one side of the motor, end segment 125 moves toward coil 504, which is located at the opposite side of the motor. Likewise, when end segment 159 moves toward coil 506, end segment 199 automatically moves toward coil 506, at the opposite side of the motor. Likewise when end segment 149 moves toward coil 508, end segment 189 automatically moves toward coil 508. All these coils activate the magnetic iron core, around which the said are wound, and implement said iron core in becoming an electromagnet, thereby enabling the attraction of said end segments to said coils, which are closest to the end segments.

It should be noted, the coils located directly opposite one another are numbered the same as they are the opposite extensions of the same single, unified coil.

The M.C.P.C.D.'s iron core (X) introduces power into circular coil 216 via the positive connection of 229. Also, from the positive connection 229, current is introduced into coil 111, when metal bar (Y) is positioned directly opposite the empty space between two set of teeth of the said magnetic iron core (X) Current is then impelled into line 237, thereby energizing line 216. Now line 216 feeds current to coil 501, which in turn feeds current to wire 242, on one side of the motor, which in turn feeds current to wire 242 at the opposite side of the motor, both wires 242 are wire segments of a single, unified wire. Now the output of coil 501 passes on to wire 525, the ground of the AC power. This completes the circuit.

Coils 502-508 are identically wired as that of coil 501 that is with the exception of the positive imputs to these coils as follows: Positive line 216 is connected to coils 501-3-5-7 while positive line 321 leads current into coils 502,504,506,508.

Figure 19:
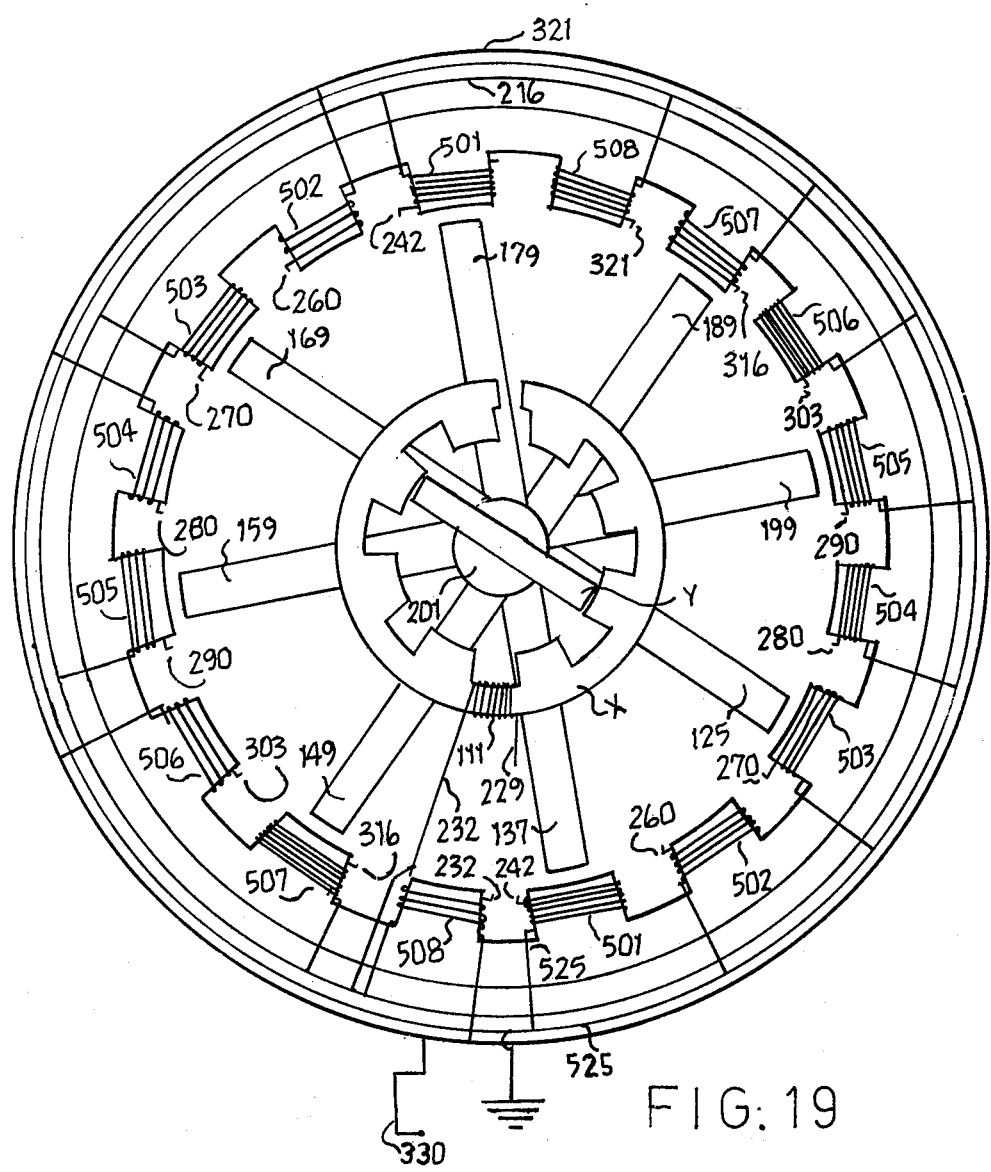
FIG. 19, is a schematic drawing illustrating the application of the innovative method in conjunction with the magnetic current power control device adapted to function as a brushless motor, simultaneously as it controls the increase and decrease of electrical current.

Not shown in FIG. 19 is an additional iron core (X) and bar (Y) with its own coil (see coil 111 identical in size shape and structure to that shown in FIG. 19. The difference between the upper core (x) and bar (Y) shown in FIG. 19 and that of its twin below (not shown) is as follows: when bar (Y) is situated facing the teeth of its core (X) as shown in FIG. 19, bar (Y) of the lower core (X) is situated between the teeth of its core. Hence, when core (X) and bar (Y) expels current, the lower core (X) and bar (Y) impels current. Wire 237 of the lower core (X) is connected to wire 330 of the upper core (X). Just as the upper core (X) impels current to coils 501-3-5 and 507 the lower core (X) impels current to coils 502-4-6 and 508. Hence, when 179 is pulled to coil 502, bar 159 is pulled to coil 506. Current to coils 502,504,506 and 508 is passed simultaneously on both sides of the motor, thus causing bars 137,125,199 and 189 to move in the same direction as their connected counterparts, so that when bar 179 moves toward coil 502 bar 137 also moves toward coil 502, etc. At the instant when metal upper bar (Y) is positioned to expell the current passing on to coils 501-3-5 and 507, lower metal bar (Y) lower metal bar (Y) impels current to coils 502-4-6 and 508 and attracting armature bars 179,162,159 and 149 as is its connected counterparts 137,162,159 and 189 likewise are also attracted at the oposite side of the motor. This porcess of induction and counterinduction are repeated consecutively, thereby enabling the operation of a brushless motor with numerous coils. It should be noted that such innovative devices can be stacked in sets of multiples, by twos by fours, etc. appropriately wired to secure increased power. Note also that in FIG. 19 that wires similarly numbered are connected to each other, such as: 242 to 242, 260 to 260, 270 to 270, 280 to 280 etc.

Describing now the internal operation of the M.C.P.C.D. adapted as functioning as a relay and switching device. See FIG. 20.

The advantages of an M.C.P.C.D. adapted to function as a relay and switching device can be listed as follows: The M.C.P.C.D. is capable of switching any circuit and controlling the electrical appliances connected to said circuit by employing only a fraction of the current normally required to perform the same function. For example: To turn ON or to turn OFF an electrical appliance requiring 100 amperes, normally a relay using 5 amperes is required. This operation is fraught with the danger of sparking, or burning our, or wearing out the attached electrical appliance. However, with the application of the MC.P.C.D., these dangers are not present as the circuit is continuously connected. The M.C.P.C.D. neither breaks direct contact with the circuit not makes direct contact with the circuit. Thus to turn ON or to turn OFF an electrical appliance requiring 100 amperes, the M.C.P.C.D. adapted as a relay requires a motor using only 6 volts and ⅓rd of an ampere. The relay can be adapted to operate solely by use of a person's voice, and can be employed to open and close a circuit by using very little current. Also when operating in conjunction with an electrical timing device, the M.C.P.C.D. can be enabled to regulate the light intensity of a particular area, and the light intensity emitting from lighting system, depending upon the time of day. When minimum light intensity is desired, such as during the peak daylight hours, minimum light intensity can be automatically provided. When maximum light intensity is desired, such as during nighttime hours, maximum light intensity can be automatically provided.

Figure 20:
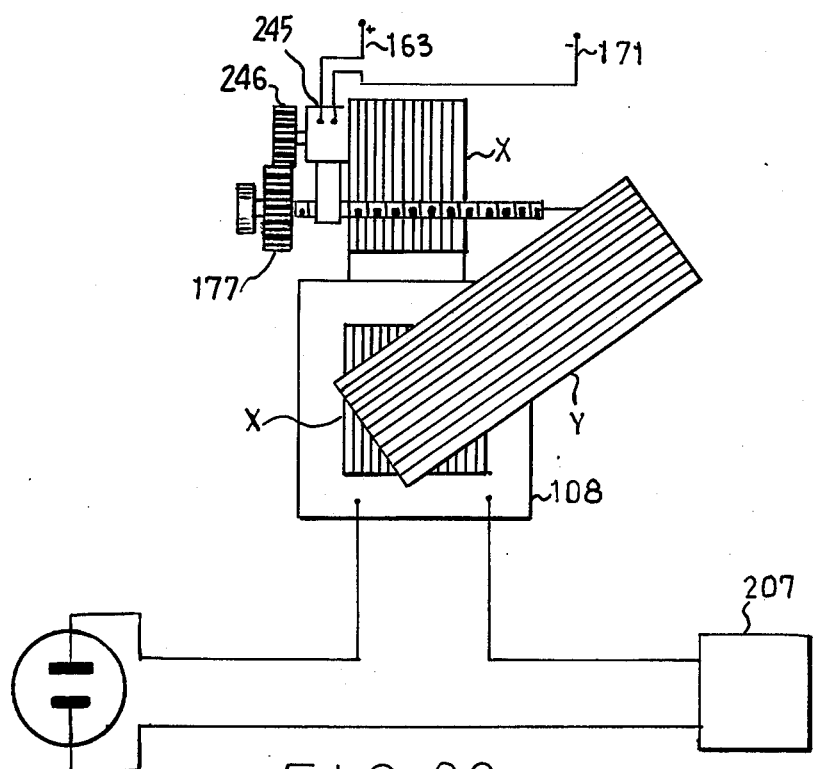
FIG. 20 is a schematic drawing illustrating the application of the innovative method in conjunction with the magnetic current power control device adapted to function as a relay, simultaneously as it controls the increase and decrease of electrical current.

FIG. 20, is a top view of the M.C.P.C.D. applied to function as a relay and switching device.

When metal bay Y rotates straight over the magnetic iron core X of the M.C.P.C.D., in a vertical position, it closes and shuts off the connected A.C. device 207. When metal bar Y is not rotated to a vertical position over the magnetic iron core X of the M.C.P.C.D., it opens and turns on the connected A.C. device. Metal bar Y closes e.g. lighting system by inducing the counter inductive magnetic field and the counter inductive alternating current. Metal bar Y opens the lighting system by reducing the counter inductive magnetic field. Metal bar Y is caused to move by means of gear apparatus 177 and motor 245. When gear apparatus 177 rotates, its screw shaft either moves outwardly to the right or moves inwardly to the left in an upright position. Gear apparatus 177 is operated by motor 245, a 6 volt motor. When gear 246 rotates counter clockwise, screw of gear 177 turns clockwise, causing metal bar (Y) to retract to a vertical position. When gear 246 rotates clockwise screw of gear apparatus 177 turns counter clockwise, causing metal bar (Y) to move outwardly towards the right. The movement of metal bar (Y) can be adjusted to correspond to any increase or decrease of current between minimum and maximum levels. Very little power is required to move metal bar (Y). A time interval of seconds in duration is elapsed between the closing of the electrical appliance connected to the M.C.P.C.D. and the opening of the electical appliance connected to the M.C.P.C.D. and vice versa. This aid time interval lapse, caused intentionally, safeguards the circuitry and the connected electrical appliance from the stress normally present when circuits and connected appliances are either opened suddenly or closed suddenly. Motor is powered by two wires, wire 163 and wire 171. Wire 163 is connected to the positive pole and wire 171 is connected to the negative pole. Clockwise movement of motor 245 and of gear apparatus 177 is obtained when wire 163 is connected to the positive pole and wire 171 is connected to the negative pole. When the connections of wire 163 and wire 171 are reversed, that is when 163 is connected to the negative pole, and 171 is connected to the positive pole, a counter clockwise movement of motor 245 and of gear apparatus 177 is obtained. 108 is an extention to enable the connection of wires.

Figure 21:
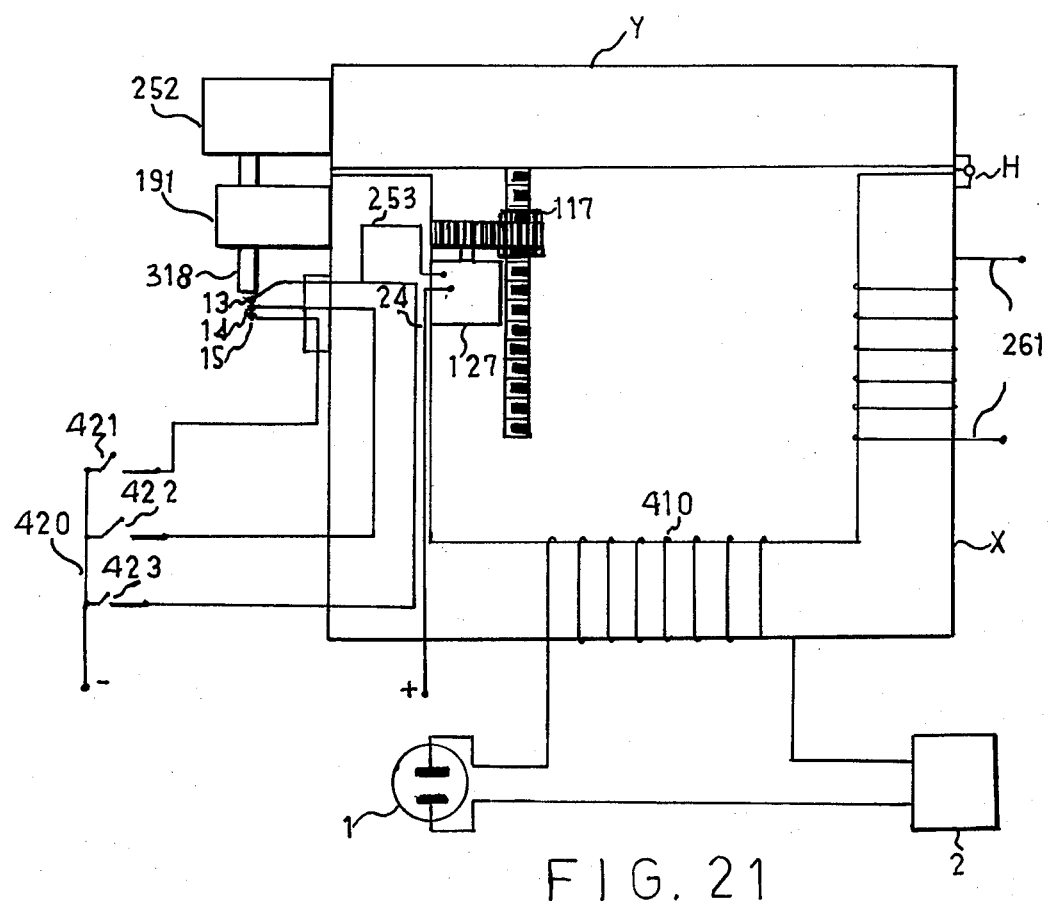
FIG. 21, is a schematic drawing illustrating the application of the innovative method in conjunction with the magnetic current power control device adapted to function as a relay, simultaneously as it controls the increase and decrease of electrical current.

In FIG. 21, coil 410 is wound around one of the sides of the "U" shaped magnetic iron core (X) of the M.C.P.C.D. Coil 410 is wired to plug (l) and to the connected electrical appliance 502. Metal bar (Y) is also operated by motor 127 and gear apparatus 117. Motor 127 when activated, causes gear apparatus 117 to either rotate M.C.P.C.D. metal bar (Y) upwards, or rotate M.C.P.C.D. metal bar (Y) downwards. There are three switches, 421, 422, and 423. There are three prongs, (13),(14) and (15), which said prongs are pressed by a pushbutton apparatus. Block 191 and block 252 hold the pushbutton bar/in place. When metal bar (Y) is moved upwards, prongs (13),(14) and (15) will spread apart and disconnect. When metal bar (Y) is moved downwards, prongs (13),(14) and (15) will draw together and connect. Now motor 127 has two wires. Wire (24) and wire 253. Wire (24) is connected to the positive pole and wire 253 is connected to switch (13) of an electric timing device. The said electric timing device, not shown, has three different switches, 421, 422 and 423. When the electric timing device not shown rotates to a preset first time level, requiring minimum current, switch 421 will close and energize motor 127, which in turn passes current into prongs (13),(14), and (15), which in turn passes current back to motor 127. Motor 127 stops when prong (14) is detached from prong (15). When the electric timing device not shown rotates to a first time level or higher, motor 127 will stop, and metal bar (Y) will rise to a height coordinated with said first time level, thereby enabling a minimum of current and power to pass into the connected A.C. lighting system 502 for example, thereby enabling an emission of minimum light intensity. When the electric timing device not shown rotates to a second time level or higher, switch 422 is turned to ON, thereby enabling metal bar (Y) to rise to a height coordinated with said second time level, thereby enabling a commensurate increase of current to pass into the A.C. lighting system thereby enabling a commensurate increase in light intensity emission. And when the electric timing device not shown rotates to a third time level or higher, switch 423 is turned to ON, thereby enabling metal bar (Y) to rise to a height coordinated with said third time level, thereby enabling a maximum of current to pass into the connected A.C.

lighting system, thereby enabling an emission of maximum light intensity. When prong (13) is energized, metal bar (Y) rises to its maximum height, thereby increasing the current flowing from motor 127 to maximum. We have described three different preset levels of lighting intensity correlated with three different preset time levels of the electric timing device.

We can in like manner arrange for twenty different preset time levels to increase or decrease current by normal or reverse contacts to 127 and correlate each time level with a different preset lighting intensity correlated with the said time level. We can in like manner, arrange for two or more time levels to set two or more different electrical appliances attached to the M.C.P.C.D., such as a fan, which requires 1 ampere to operate, and such as a motor that requires 10 amperes to operate. In this example, the fan would be connected to coil 410 and the motor would be connected to coil 261. Thus when switch 421 is enabled, the electric fan would turn to ON, and when switch 422 is enabled the motor would turn to ON. In like manner, preset selective timing arrangements could be arranged for the timely operation of 10 or more different electrical appliances, by connecting each different appliance to a different coil wound around the magnetic iron core (X).

We claim:

1. An apparatus for providing accurate control of an electrical condition for at least one output device comprising,
    (a) a reactor means having a magnetic core with an air gap located at a top portion of said means,
    (b) first wiring means for connection to at least one electrical output device,
    (c) a moveable bar for precisely adjusting the opening and closing of said air gap of said reactor means,
    (d) said maveable bar supporting a power control knob and a fine tuning knob in conjunction thereon, wherein said fine tuning knob is utilized for fine or decimal tuning operations while said power control knob is utilized for cores, i.e. unit tuning, whereby is provided manual control for an immediate or gradual increase or decrease of the reluctance path available through said reactor means, whereby is provided said accurate control,
    (e) a meshing gear connected between said power control knob and said fine tuning knob,
    (f) said moveable bar being hingedly affixed to said reactor means,
    (g) input terminals for connection to a power supply with second wiring means connecting said input terminals to said reactor means.

2. An apparatus as claimed in claim 1, wherein said reactor means comprises a c-shaped core with said moveable bar hinged at an arm of said core, 3. An apparatus comprising a plurality of reactor means as claimed in claim 50 with said respective input terminals of said reactor means connected to a common power supply,
    (a) a motor comprising the output device of one of said plurality of reactor means and said motor connected to and controlling a control knob of said other reactor means.

4. An apparatus, as claimed in claim 1, wherein said reactor means comprises a c-shaped core and wherein said moveable bar is hinged to both arms of said core.

5. An apparatus, as claimed in claim 1 wherein said reactor means and said electrical output device connects to a common power supply and wherein said control knob is supported by an arm of said reactor means,
    (a) an electric motor geared to and controlling said control knob supported by an arm of said reactor means.

6. An apparatus, as claimed in claim 1, wherein said reactor means and said electrical output device are connected to a common power supply,
    (a) an electrical motor geared to and controlling said control knob,
    (b) timed switching means connected to and energizing said motor at desired times, and whereby said metal bar is set over said air gap at desired position settings.

7. An apparatus, as claimed in claim 1, wherein said input terminals of said reactor's second wiring means also connects circuit breaking means which is reset automatically, to a common power supply.

8. An electrical apparatus, as claimed in claim 1, wherein said second wiring means connects said reactor means to a second ciruit means, said second circuit means associated with a light input device connected to a power supply and said first wiring means is connected to a first circuit means, for producing outputs precisely automatically adjusted to desired preselected levels of light inversely proportional to the illumination levels of ambient light.

9. An apparatus comprising a plurality of reactor means as claimed in claim 1, wherein said second wiring means connects said plurality of reactor means to a second circuit means, said second circuit means associated with an oscillator controlling a common magnetic reactance in said plurality of reactor means, with said plurality of reactor means and a plurality of input devices connected to a common power supply, and whereby said first wiring means connects to a first circuit means for producing outputs in a plurality of connected electrical output devices, precisely, automatically adjusted to desired preselected output levels inversely proportional to the input levels of the said input devices connected to said second circuit means.

10. An apparatus, as claimed in claim 1, whereby said metal bar and said reactor means individually act to perform the function as both said metal bar and said reactor means with respect to each other and whereby each of said metal bars are connected to one or more electrical output devices and to a common power supply.

11. An oscillator, comprising of auxiliary electronics and said apparatus as claimed in claim 1, is connected to an electrical output device and to a common DC power supply, whereby controlling the oscillator's frequency, controls the current output to the said output device.

* * * * *